(12) United States Patent
Rimon et al.

(10) Patent No.: US 10,296,086 B2
(45) Date of Patent: May 21, 2019

(54) DYNAMIC GLOVES TO CONVEY SENSE OF TOUCH AND MOVEMENT FOR VIRTUAL OBJECTS IN HMD RENDERED ENVIRONMENTS

(71) Applicant: Sony Interactive Entertainment Inc., Tokyo (JP)

(72) Inventors: Noam Rimon, San Mateo, CA (US); Xiaodong (Crusoe) Mao, San Mateo, CA (US); Xiaoyong Ye, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 49 days.

(21) Appl. No.: 14/664,740

(22) Filed: Mar. 20, 2015

(65) Prior Publication Data
US 2016/0274662 A1  Sep. 22, 2016

(51) Int. Cl.
| | | |
|---|---|---|
| *G06F 3/01* | (2006.01) | |
| *G06T 7/20* | (2017.01) | |
| *G06F 3/16* | (2006.01) | |
| *G02B 27/01* | (2006.01) | |
| *A63F 13/355* | (2014.01) | |
| *A63F 13/285* | (2014.01) | |

(52) U.S. Cl.
CPC .......... *G06F 3/014* (2013.01); *A63F 13/285* (2014.09); *A63F 13/355* (2014.09); *G02B 27/0172* (2013.01); *G06F 3/011* (2013.01); *G06F 3/016* (2013.01); *G06F 3/017* (2013.01); *G06F 3/16* (2013.01); *G06T 7/20* (2013.01); *G02B 2027/0138* (2013.01); *G02B 2027/0141* (2013.01)

(58) Field of Classification Search
CPC .... G06F 3/016; G06F 3/0481; G06F 3/04886; G06F 2203/014
See application file for complete search history.

(56) References Cited

U.S. PATENT DOCUMENTS

| | | | | |
|---|---|---|---|---|
| 4,710,020 A | | 12/1987 | Maddox et al. | |
| 5,184,319 A | * | 2/1993 | Kramer | G06F 3/011 345/156 |
| 5,516,249 A | * | 5/1996 | Brimhall | B25J 3/04 414/5 |

(Continued)

OTHER PUBLICATIONS

ISR and Written Opinion PCT/US2012/30478, dated Jul 24, 2012, 11 pages.

(Continued)

*Primary Examiner* — Ricardo Osordio
(74) *Attorney, Agent, or Firm* — Penilla IP, APC

(57) ABSTRACT

A system and method of using a peripheral device for interfacing with a virtual reality scene generated by a computer for presentation on a head mounted display. The peripheral device includes a haptic device capable of being placed in contact with a user and a haptic feedback controller for processing instructions for outputting a haptic signal to the haptic device. The haptic feedback controller receiving the instructions from the computer so that haptic feedback of the haptic device changes to correspond to a user's virtual interactions with a virtual object in the virtual reality scene as presented on the head mounted display.

23 Claims, 16 Drawing Sheets

(56) References Cited

U.S. PATENT DOCUMENTS

| | | | |
|---|---|---|---|
| 5,631,861 A * | 5/1997 | Kramer | G06F 3/011 |
| | | | 414/5 |
| 5,912,700 A | 6/1999 | Honey et al. | |
| 5,963,331 A * | 10/1999 | Arai | A61B 5/103 |
| | | | 356/613 |
| 6,042,555 A * | 3/2000 | Kramer | A61B 5/225 |
| | | | 600/595 |
| 6,088,017 A * | 7/2000 | Tremblay | G06F 3/011 |
| | | | 345/156 |
| 6,152,854 A * | 11/2000 | Carmein | A63B 22/025 |
| | | | 198/779 |
| 6,609,797 B2 | 8/2003 | Ejiri et al. | |
| 6,646,251 B1 | 11/2003 | Okamoto | |
| 6,952,003 B2 | 10/2005 | Skurnik et al. | |
| 7,075,661 B2 | 7/2006 | Petty et al. | |
| 7,138,976 B1 * | 11/2006 | Bouzit | G06F 3/014 |
| | | | 345/156 |
| 7,451,633 B2 | 11/2008 | Bang et al. | |
| 7,626,569 B2 * | 12/2009 | Lanier | G06F 1/1601 |
| | | | 345/156 |
| 7,729,515 B2 | 6/2010 | Mandella et al. | |
| 7,996,097 B2 | 8/2011 | Dibernardo et al. | |
| 8,314,770 B2 | 11/2012 | Deliwala | |
| 8,791,901 B2 | 7/2014 | Mallinson | |
| 9,215,293 B2 * | 12/2015 | Miller | H04L 67/38 |
| 9,468,847 B2 * | 10/2016 | Bekri | A63F 13/285 |
| | | | 3/285 |
| 9,652,038 B2 * | 5/2017 | Osman | A63F 13/212 |
| 2002/0036779 A1 | 3/2002 | Kiyoi et al. | |
| 2002/0085097 A1 | 7/2002 | Colmenarez et al. | |
| 2002/0131052 A1 | 9/2002 | Emery | |
| 2002/0131056 A1 | 9/2002 | Fujii et al. | |
| 2002/0194914 A1 | 12/2002 | Foxlin et al. | |
| 2003/0158699 A1 | 8/2003 | Townsend et al. | |
| 2003/0233870 A1 | 12/2003 | Mancevski | |
| 2003/0234823 A1 | 12/2003 | Sato et al. | |
| 2004/0233461 A1 | 11/2004 | Armstrong et al. | |
| 2004/0252102 A1 | 12/2004 | Wilson et al. | |
| 2005/0086243 A1 | 4/2005 | Abbott et al. | |
| 2005/0213082 A1 | 9/2005 | DiBernardo et al. | |
| 2006/0033713 A1 | 2/2006 | Pryor | |
| 2006/0047427 A1 | 3/2006 | Weed et al. | |
| 2006/0284979 A1 | 12/2006 | Clarkson | |
| 2007/0273610 A1 | 11/2007 | Baillot | |
| 2008/0297437 A1 | 12/2008 | Hiroshi | |
| 2009/0066725 A1 | 3/2009 | Nogami et al. | |
| 2009/0157478 A1 * | 6/2009 | Yang | G06Q 30/02 |
| | | | 705/7.29 |
| 2010/0245237 A1 | 9/2010 | Nakamura | |
| 2012/0182135 A1 * | 7/2012 | Kusuura | G06F 3/00 |
| | | | 340/407.1 |
| 2013/0117377 A1 | 5/2013 | Miller | |
| 2014/0092461 A1 | 4/2014 | Spitzer et al. | |
| 2014/0160162 A1 | 6/2014 | Balachandreswaran | |
| 2014/0225918 A1 | 8/2014 | Mittal et al. | |
| 2014/0336669 A1 * | 11/2014 | Park | A61B 19/2203 |
| | | | 606/130 |
| 2014/0337724 A1 | 11/2014 | Tremblay et al. | |
| 2014/0349762 A1 * | 11/2014 | Haas | A63F 13/24 |
| | | | 3/24 |
| 2016/0078770 A1 * | 3/2016 | Coulmeau | G08G 5/0039 |
| | | | 701/3 |

OTHER PUBLICATIONS

ISR and Written Opinion PCT/US2016/016653, dated May 13, 2016, 3 pages.

ISR and Written Opinion PCT/US2016/017401, dated May 11, 2016, 4 pages.

TW Appln No. 105105120, Search Report dated Feb. 27, 2017, 1 page.

* cited by examiner

DYNAMIC GLOVES TO CONVEY SENSE OF TOUCH AND MOVEMENT FOR VIRTUAL OBJECTS IN HMD RENDERED ENVIRONMENTS

TECHNICAL FIELD

The present invention relates generally to virtual environments, and more particularly, to methods and systems for interfacing with virtual objects in the context of wearing and using a head mounted display (HMD).

DESCRIPTION OF RELATED ART

One of the rapidly growing technologies in the field of human-computer interaction is various head-mounted displays (HMDs), which may be worn on a user's head and which have one or two displays in front of the one or two of the user eyes. This type of display has multiple commercial applications involving simulation of virtual reality including video games, medicine, sport training, entertainment applications, and so forth. In the gaming field, these displays may be used, for example, to render three-dimensional (3D) virtual game worlds.

Although much advancement has occurred in the HMD field, the technology still needs advancement to bring physical reality to real user interactions with virtual objects rendered in virtual environments presented in HMDs.

It is in this context that the following embodiments arise.

SUMMARY

Broadly speaking, the present invention fills these needs by providing a system, method and apparatus for simulating different feelings and textures of virtual objects in a virtual environment. It should be appreciated that the present invention can be implemented in numerous ways, including as a process, an apparatus, a system, or a device. Several inventive embodiments of the present invention are described below.

One embodiment describes a peripheral device for interfacing with a virtual reality scene generated by a computer for presentation on a head mounted display. The peripheral device includes a haptic device capable of being placed in contact with a user and a haptic feedback controller for processing instructions for outputting a haptic signal to the haptic device. The haptic feedback controller receives instructions from the computer so that haptic feedback of the haptic device changes to correspond to a user's virtual interactions with a virtual object in the virtual reality scene as presented on the head mounted display.

The haptic device can include one or more of a compressed gas, a liquid, an electric motor, a linear motor, an electromagnet, a piezo-electric device, a heating element, a cooling element, one or more electroactive polymers or one or more phase changing materials or other devices capable of imparting one or more touch sensations to the user. The haptic device can simulate a texture of the virtual object, a shape of the virtual object, an amount of pressure virtually exerted on the user by the virtual object, an amount of movement such as vibration or other movements of the virtual object or a proximity of the virtual object to a second virtual object.

The peripheral device can also include at least one motion sensor coupled to the haptic feedback controller and capable of detecting motion of the peripheral device and outputting a motion signal to the feedback controller and/or the computer.

The haptic device can be disposed in an article of clothing capable of being worn by a user such as a glove, a hat, footwear, pants or shirt. The haptic device can also be disposed in the head mounted display.

Another embodiment provides a method of simulating a touch feeling of contact with a virtual object in a virtual environment presented in a head mounted display. The method includes receiving haptic instructions by a peripheral device having at least one haptic device capable of being in contact with a user. The contact can be direct or indirect. The haptic instruction corresponds to at least one of texture characteristics, temperature characteristics, movement characteristics or shapes of the virtual object presented in the virtual environment. The peripheral device representing contact with the virtual object. A haptic feedback of the haptic device in the peripheral device can be changed to correspond to an interaction with the virtual object in the virtual environment. The haptic instructions can be included in a haptic profile that can be sent from the computer to the peripheral device and stored in the peripheral device.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for simulating different feelings and textures of virtual objects in the virtual environment will now be described. It will be apparent to those skilled in the art that the present invention may be practiced without some or all of the specific details set forth herein.

One approach to simulating different feelings and textures of virtual objects is to use a glove (or gloves) that can apply a dynamically adjustable pressure and/or texture to the user's hand(s). The glove can squeeze the user's hand or flex the user's hand and/or fingers to correspond to the feeling and textures of the virtual object in the three-dimensional (3D) virtual environment presented to the user in a head-mounted display (HMD).

Figure 1:
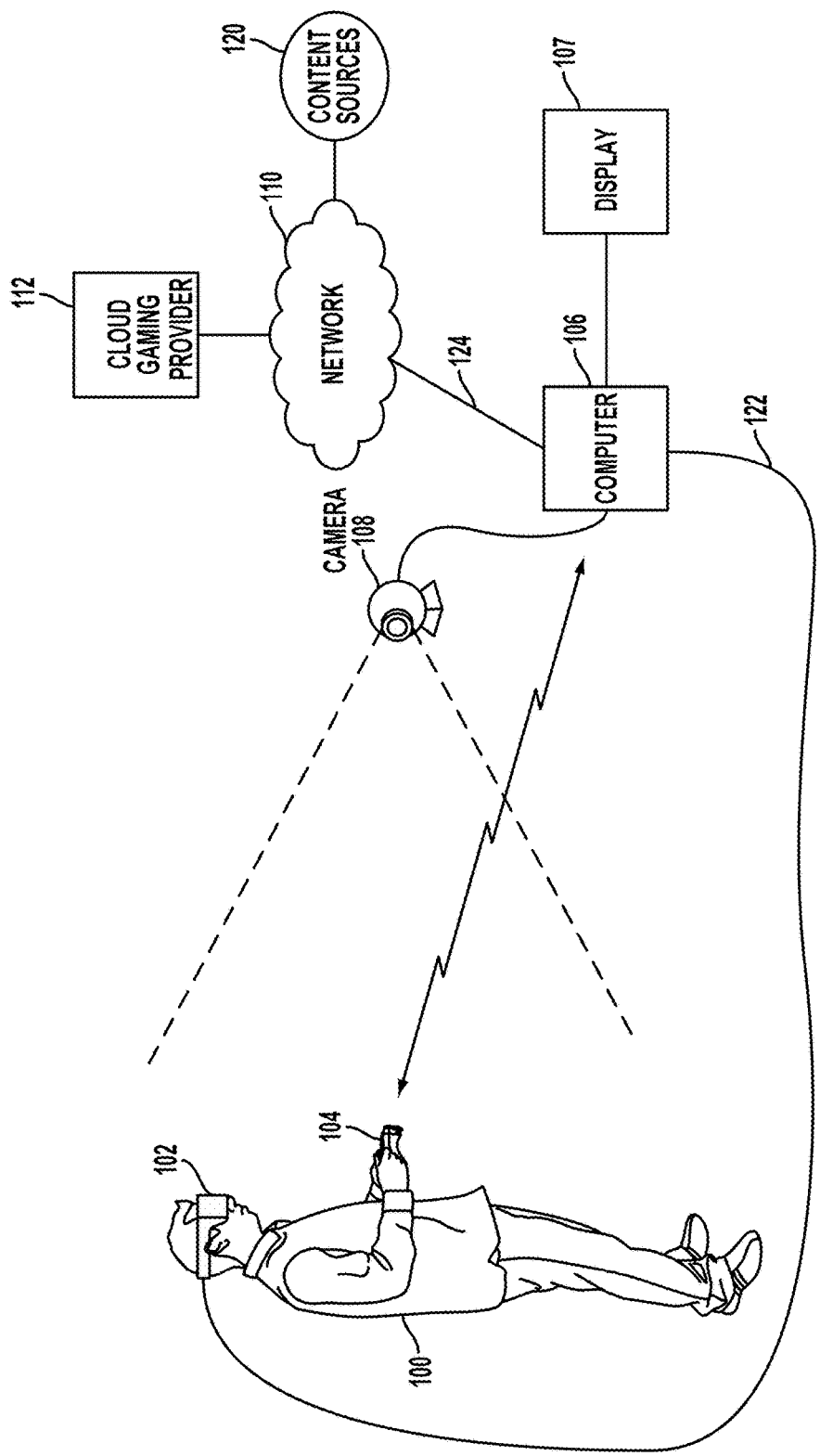
FIG. 1 illustrates a system for interactive gameplay of a video game, in accordance with one of the disclosed embodiments.

FIG. 1 illustrates a system for interactive gameplay of a video game, in accordance with one of the disclosed embodiments. A user 100 is shown wearing a head-mounted display (HMD) 102. The HMD 102 is worn in a manner similar to glasses, goggles, or a helmet, and is configured to display a video game or other content to the user 100. The HMD 102 is configured to provide an immersive experience to the user by virtue of its provision of display mechanisms (e.g., optics and display screens) in close proximity to the user's eyes and the format of the content delivered to the HMD. In one example, the HMD 102 may provide display regions to each of the user's eyes which occupy large portions or even the entirety of the field of view of the user.

In one embodiment, the HMD 102 may be connected to a computer 106. The connection 122 to computer 106 may be wired or wireless. The computer 106 may be any general or special purpose computer, including but not limited to, a gaming console, personal computer, laptop, tablet computer, mobile device, cellular phone, tablet, thin client, set-top box, media streaming device, etc. In some embodiments, the HMD 102 may connect directly to a network 110 such as the internet, which may allow for cloud gaming without the need for a separate local computer. In one embodiment, the computer 106 may be configured to execute a video game (and other digital content), and output the video and audio from the video game for rendering by the HMD 102. The computer 106 is also referred to herein as a client system 106, which in one example is a video game console.

The computer 106 may, in some embodiments, be a local or remote computer, and the computer may run emulation software. In a cloud gaming embodiment, the computer 106 is remote and may be represented by multiple computing services that may be virtualized in data centers, wherein game systems/logic may be virtualized and distributed to user over a network 110.

The user 100 may operate a controller 104 to provide input for the video game. In one example, a camera 108 may be configured to capture image of the interactive environment in which the user 100 is located. These captured images may be analyzed to determine the location and movements of the user 100, the HMD 102, and the controller 104. In one embodiment, the controller 104 includes a light (or lights) which may be tracked to determine its location and orientation. Additionally, as described in further detail below, the HMD 102 may include one or more lights 200A-K which may be tracked as markers to determine the location and orientation of the HMD 102 in substantial real-time during game play.

The camera 108 may include one or more microphones to capture sound from the interactive environment. Sound captured by a microphone array may be processed to identify the location of a sound source. Sound from an identified location may be selectively utilized or processed to the exclusion of other sounds not from the identified location. Furthermore, the camera 108 may be defined to include multiple image capture devices (e.g. stereoscopic pair of cameras), an IR camera, a depth camera, and combinations thereof.

In some embodiments, computer 106 may execute games locally on the processing hardware of the computer 106. The games or content may be obtained in any form, such as physical media form (e.g., digital discs, tapes, cards, thumb drives, solid state chips or cards, etc.) or by way of download from the Internet, via network 110. In another embodiment, the computer 106 functions as a client in communication over a network with a cloud gaming provider 112. The cloud gaming provider 112 may maintain and execute the video game being played by the user 100. The computer 106 transmits inputs from the HMD 102, the controller 104 and the camera 108, to the cloud gaming provider 112, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104 or other input devices, e.g., gloves, clothes, the HMD 102, or combinations of two or more thereof.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage of network traffic. The connections 124 to the network by the HMD 102, controller 104, and camera 108 may be wired or wireless. In some embodiments, content executed on the HMD 102 or displayable on a display 107, may be obtained from any content source 120. Example content sources may include, for instance, internet websites that provide downloadable content and/or streaming content. In some examples, the content may include any type of multimedia content, such as movies, games, static/dynamic content, pictures, social media content, social media websites, etc.

As will be described below in more detail, a user 100 may be playing a game on the HMD 102, where such content is immersive 3D interactive content. The content on the HMD 102, while the player is playing, may be shared to a display 107. In one embodiment, the content shared to the display 107 may allow other users proximate to the user 100 or remote to watch along with the user's play. In still further embodiments, another user viewing the game play of user 100 on the display 107 may participate interactively with player 100. For example, a user viewing the game play on the display 107 may control characters in the game scene, provide feedback, provide social interaction, and/or provide comments (via text, via voice, via actions, via gestures, etc.,) which enables users that are not wearing the HMD 102 to socially interact with user 100, the game play, or content being rendered in the HMD 102.

Figure 2:
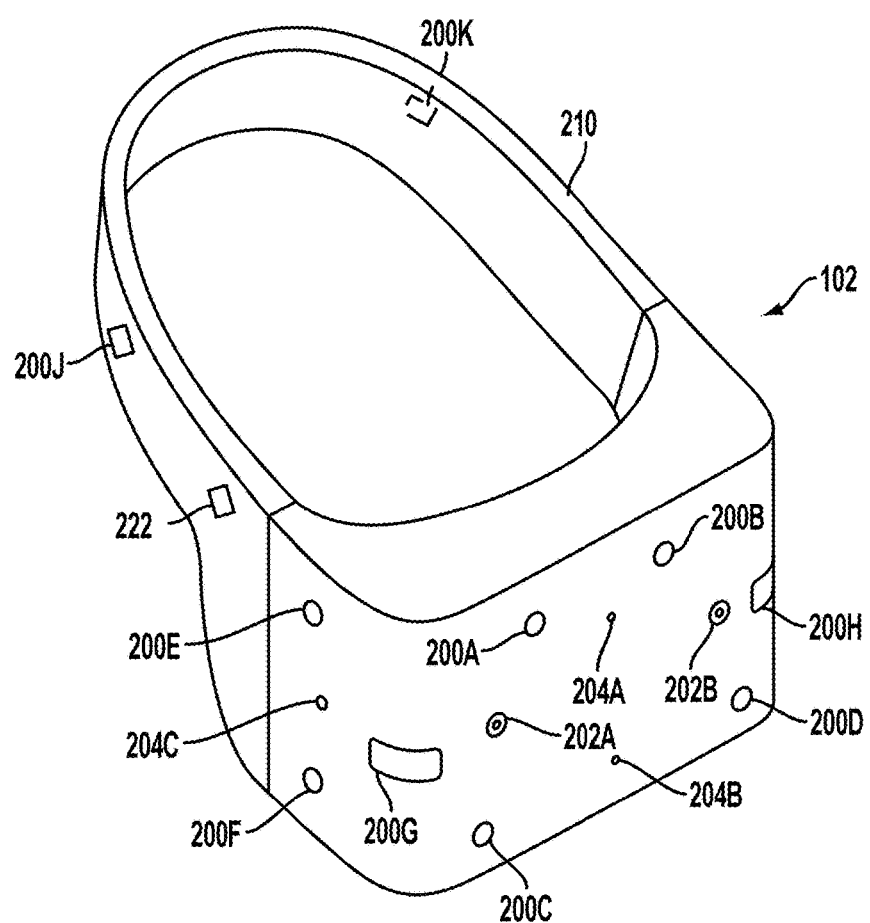
FIG. 2 illustrates a HMD, in accordance with one of the disclosed embodiments.

FIG. 2 illustrates a HMD 102, in accordance with one of the disclosed embodiments. As shown, the HMD 102 includes a plurality of lights 200A-K (e.g., where 200K and 200J are located toward the rear or backside of the HMD headband 210). Each of these lights may be configured to have specific shapes and/or positions, and may be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights may be identified in captured images of an interactive environment in which a user uses the HMD 102.

Based on identification and tracking of the lights, the location and orientation of the HMD 102 in the interactive environment may be determined. It will further be appreciated that some of the lights 200A-K may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device. In some embodiments, inertial sensors are disposed in the HMD 102, which provide feedback regarding positioning, without the need for lights 200A-K. In some embodiments, the lights and inertial sensors work together, to enable mixing and selection of position/motion data.

In one embodiment, the lights may be configured to indicate a current status of the HMD 102 to others in the vicinity. For example, some or all of the lights 200A-K may be configured to have a certain color arrangement, intensity arrangement, be configured to blink, have a certain on/off configuration, or other arrangement indicating a current status of the HMD 102. By way of example, the lights 200A-K may be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights 200A-K might also be configured to indicate relative intensity levels of gameplay. For example, the intensity of lights 200A-K, or a rate of blinking, may increase when the intensity of gameplay increases.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones 204A-C, sound from each of the microphones may be processed to determine the location of the sound's source. This information may be utilized in various ways, including exclusion of unwanted sound sources, association of a sound source with a visual identification, etc.

The HMD 102 may also include one or more image capture devices. In the illustrated embodiment, the HMD 102 is shown to include image captured devices 202A and 202B. By utilizing a stereoscopic pair of image capture devices, three-dimensional (3D) images and video of the environment may be captured from the perspective of the HMD 102. Such video may be presented to the user to provide the user with a "video see-through" ability while wearing the HMD 102. That is, though the user cannot see through the HMD 102 in a strict sense, the video captured by the image capture devices 202A and 202B may nonetheless provide a functional equivalent of being able to see the environment external to the HMD 102 as if looking through the HMD 102.

Such video may be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras or a single camera may be installed on the HMD 102, and oriented in any direction. For example, in another embodiment, there may be cameras mounted on the sides of the HMD 102 to provide additional panoramic image capture of the environment. In one embodiment, front facing camera (RCG, and/or depth cameras) may be used to track position, orientation, and motions of hands or gloves of the user. As will be described below, information from the image data captured by the front facing cameras can be used to provide finer resolution and otherwise improved haptic feedback to the user when interfacing with virtual objects.

Figure 3:
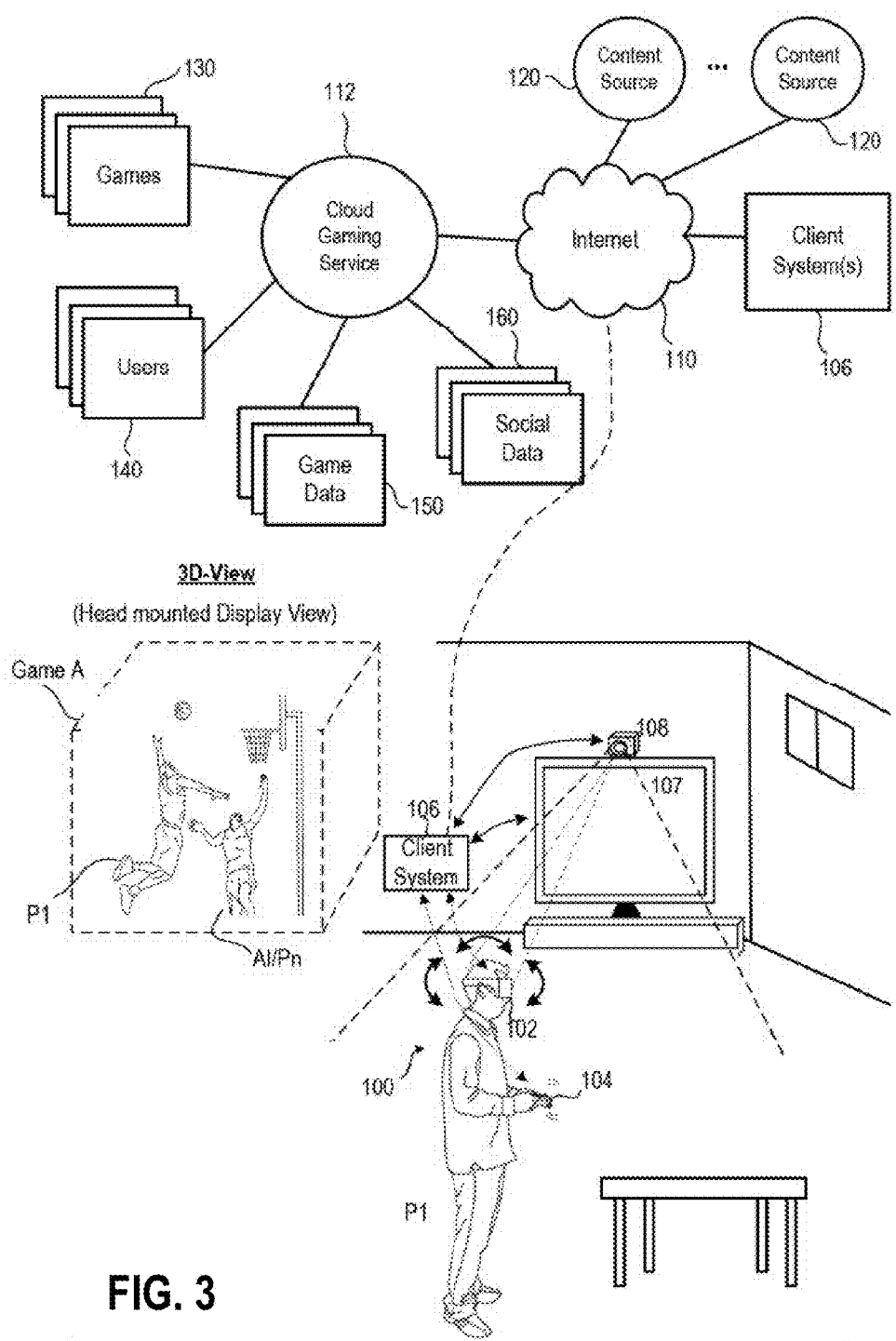
FIG. 3 illustrates one example of gameplay using the client system that is capable of rendering the video game content to the HMD of user.

FIG. 3 illustrates one example of gameplay using the client system 106 that is capable of rendering the video game content to the HMD 102 of user 100. In this illustration, the game content provided to the HMD 102 is in a rich interactive 3-D space. As discussed above, the game content may be downloaded to the client system 106 or may be executed in one embodiment by a cloud processing system. Cloud gaming service 112 may include a database of users 140, which are allowed to access particular games, share experiences with other friends, post comments, and manage their account information.

The cloud gaming service 112 may also store game data 150 for specific users, which may be usable during gameplay, future gameplay, sharing to a social media network, or for storing trophies, awards, status, ranking, etc. Social data 160 may also be managed by cloud gaming service 112. The social data 160 may be managed by a separate social media network, which may be interfaced with cloud gaming service 112 over the Internet 110. Over the Internet 110, any number of client systems 106 may be connected for access to the content and interaction with other users.

Continuing with the example of FIG. 3, the three-dimensional interactive scene viewed in the HMD 102 may include gameplay, such as the characters illustrated in the 3-D view. One character, e.g. P1, may be controlled by the user 100 that is wearing the HMD 102. This example shows a basketball scene between two players, wherein the HMD user 100 is dunking a ball on another character in the 3-D view. The other character may be an AI (artificial intelligence) character of the game, or may be controlled by another user or users (Pn). User 100, who is wearing the HMD 102 is shown moving about in a space of use, wherein the HMD may move around based on the user's head movements and body positions. The camera 108 is shown positioned over a display screen in the room, however, for HMD 102 use, the camera 108 may be placed in any location that may capture images of the HMD 102. As such, the user 100 is shown turned at about 90 degrees from the camera 108 and the display 107, as content rendered in the HMD 102 may be dependent on the direction that the HMD 102 is positioned, from the perspective of the camera 108. Of course, during HMD 102 use, the user 100 will be moving about, turning his head, looking in various directions, as may be needed to take advantage of the dynamic virtual scenes rendered by the HMD.

Figure 4:
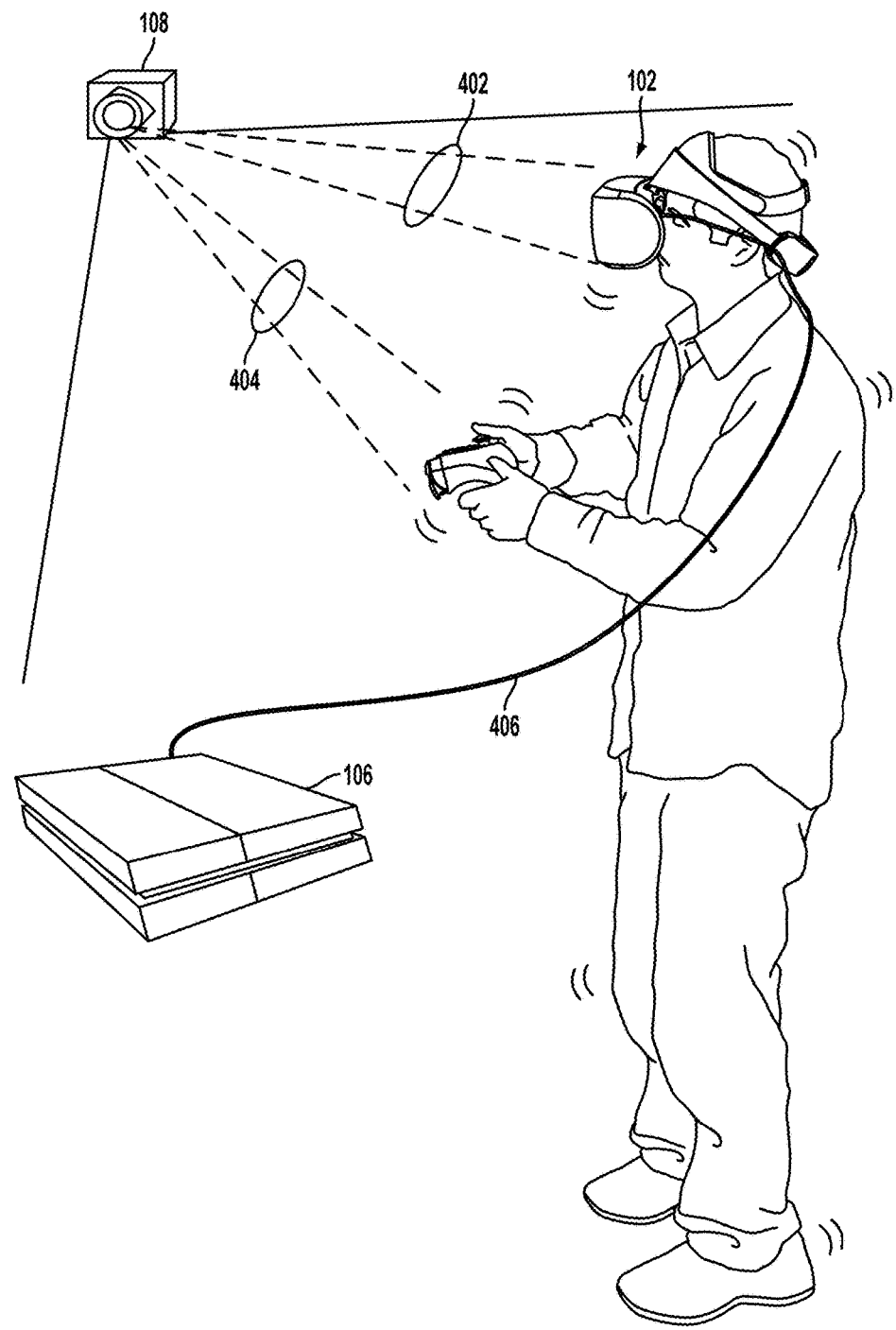
FIG. 4 illustrates a user wearing the HMD, during use, in accordance with one of the disclosed embodiments.

FIG. 4 illustrates a user wearing the HMD 102, during use, in accordance with one of the disclosed embodiments. In this example, it is shown that the HMD 102 is tracked 402 using image data obtained from captured video frames by the camera 108. In other embodiments, tracking can also utilize inertial data from the HMD itself. In various embodiments, tracking the user's head can include blended data obtained from image tracking and inertial tracking. Additionally, it is shown that the controller may also be tracked 404 using image data obtained from captured video frames by the camera 108. Also shown is the configuration where the HMD 102 is connected to the computing system 106 via a cable 406. In one embodiment, the HMD 102 obtains power from the same cable or may connect to another cable. In still another embodiment, the HMD 102 may have a battery that is rechargeable, so as to avoid extra power cords. In still other embodiments, the user's hands can be tracked, with or without gloves.

Figure 5:
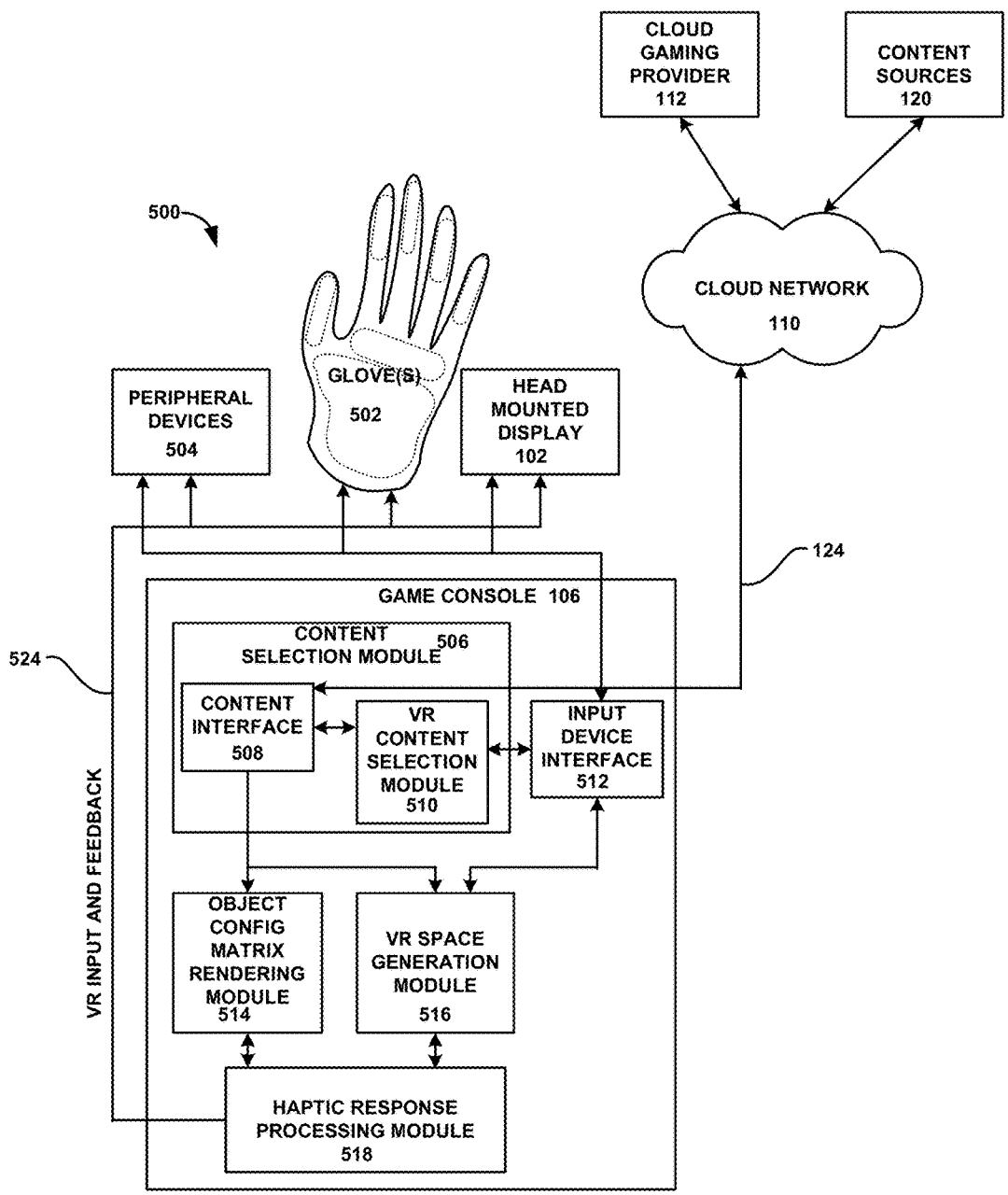
FIG. 5 is a simplified schematic of a system for providing feelings and textures of virtual objects to the user, in accordance with one of the disclosed embodiments.

FIG. 5 is a simplified schematic of a system 500 for providing feeling and/or texture of virtual objects to the user, e.g., when interacting with a virtual environment, in accordance with one of the disclosed embodiments. Generally, tracking or texture feedback is referred to as haptic feedback. Feeling, as used herein, may include the sensation detected by a human body part in response to receiving or coming into contact with an object, surface, texture, shape or thing. In some embodiments, the haptic feedback may provide both a texture and a feeling to the texture. The system 500 includes a game console 106 coupled to a cloud network 110. The cloud network 110 may provide access to a cloud gaming provider 112 and content sources 120. The cloud gaming provider may be a service that provides access to online content which can be downloaded or streamed to the game console 106. The game console 106 can be coupled to the head mounted display 102, other peripheral devices 504, and one or more clothing articles such as a mask, a shirt, pants, footwear or gloves 502, or one or more thereof.

With the above description in mind, the game console 106 may include a content selection module 506, an input device interface 512, an object configuration matrix rendering module 514, of virtual reality (VR) space generation module 516 and a haptic response process module 518. The content selection module 506 includes a content interface 508 and a virtual reality content selection module 510. In some embodiments, fewer or more modules may be provided to enable the haptic feedback during use of an HMD, which is providing interactivity to an immersive 3D virtual reality environment.

A game console 106 will have various computing components, such as one or more processors, memory systems, system buses, caching systems, storage resources, and one or more communication modules. The communication modules may include one or more of network interface cards, wireless processors, WiFi modules, Bluetooth modules and other connector interfacing logic. Additionally, the game console 106 may include various I/O interfaces for connectivity to the HMD 102, peripheral devices 504 (e.g., controllers, cameras, microphones, etc.), and gloves 502 which one or both may be worn by the user. In one embodiment, the I/O interface will use various communication protocols for interfacing with the HMD 102, peripheral devices 504 and gloves 502. The protocols may be custom protocols or standard protocols designed to communicate signals that control or review receive data from components of the gloves 502, for example. Furthermore, as used herein, the I/O interface and protocols used for communication between the console 106 and the HMD 102, peripheral devices 504 and gloves 502 may be wired or wireless, or combinations of both wireless and wired.

In some combinations, the game console 106 may have custom logic, firmware, or circuitry for processing particular execution operations. In other embodiments, the game console 106 may execute operations of various modules by processors and memory systems of the game console 106. As used herein, the discussion of modules should be viewed as being defined by any one of the above modules and configurations, or combinations thereof. Generally, however, the discussion or reference to modules can be viewed as processing by the hardware and/or software of the game console 106.

In operation, a user wearing an HMD 102 will be interfacing with game console 106 via peripheral devices 504. The user may select a type of game or content that is to be rendered in the HMD 102. The inputs to select the content are received by the game console 106 via an input device interface 512. The selection of content can be from a local storage or from an online content sources 120, the cloud gaming provider 112, or combinations thereof.

In one simple example, the user selects content using peripheral devices 504 and said selection is received by game console 106 as input via input device interface 512. The content may be a simple living room virtual space with a coffee table and a soda can, e.g., a virtual object, sitting on the coffee table. Once the content is selected, the content interface 508 will receive content for rendering the virtual space, e.g., the living room. The game console 106 will include logic for identifying virtual objects in the living room, which may include the coffee table, the soda can, the walls, the carpet, the door, and/or other virtual people and things.

The content interface 508 will pass the received content for the virtual space (e.g., living room) to an object configuration matrix rendering module 514 and a VR space generation module 516. In one embodiment, the object configuration matrix rendering module 514 will examine the received content to identify any virtual objects in the virtual space. In one embodiment, the virtual objects may have been previously processed to define data for models, textures, shapes, hardness, softness, and related physics parameters of the virtual objects. In this example, the soda can is a virtual object that may include pre-processed data (e.g., haptic profile), which may be used by the object configuration matrix rendering module 514, e.g., configuration/attributes of the virtual object. The content for rendering the virtual space, including the virtual objects is also passed to the VR space generation module 516. Continuing with the example, the user may provide interaction by reaching out into the virtual space in an attempt to touch the soda can.

When this happens, the haptic response processing module 518 can determine the corresponding haptic feedback to provide back to the user, using the haptic profile processed by the object configuration matrix rendering module and/or the haptic response processing module 518. For example, if the user is wearing a glove 502 and the user presses on the virtual soda can, the soda can will change shape, e.g., to show a crushing action. The glove will be provided haptic feedback to give the user a perception of crushing the can, e.g., such as a stepwise or smooth changing resistance between the users' fingers as the can crushes. In one embodiment, the sound of crushing the can also be provided to speaker outputs of the HMD 102.

The haptics data for the feedback, e.g., for user interaction with the virtual object can therefore, in one embodiment, be predefined and stored in a database or file or integrated with the content of the virtual space (e.g., for use by the object configuration matrix rendering module 514). In some embodiments, the data used by the object configuration matrix rendering module 514 for some virtual objects can be pre-downloaded or pre-stored to the game console 106 or the peripheral devices 504. Generally speaking, virtual objects to be rendered in virtual spaces can be associated with data that defines the types of haptic responses to be made in relation to the virtual object when a user interacts with (e.g., is tracked and identified to interact with) the virtual object in the virtual space.

In another example, when the user turns his or her HMD in a direction to the left, the input device interface 512 would receive an input from the HMD 102 (or a camera looking/tracking the HMD or a camera on the HMD). Turning of the user's head would cause a request for content to enable rendering of the virtual space to the left. The turning is therefore an input to input device interface 512 that goes to VR content selection module 510 so that the data can be rendered and provided to the HMD.

For the VR space to be rendered, the content interface 508 outputs the selected and obtained VR content to the object configuration matrix rendering module 514 and the VR space generation module 516. As maintained above, the object configuration matrix rendering module 514 identifies the virtual objects present in the VR space presented in the HMD 102.

The VR space generation module 516 generates or assists in the virtual environment or space presented in the HMD 102. Haptic response processing module 518 receives the virtual object data and the virtual space data from the object configuration matrix rendering module 514 and the VR space generation module 516. Haptic response processing module uses the virtual object data and virtual space data to calculate corresponding haptic instructions for the peripheral devices 504, the head mounted display 102, and/or the gloves 502 that are in contact or use by the user.

As still another example, if the user is walking in the virtual space and he encounters a breeze, the HMD 102 may output one or more sensations of a wind such as blowing air in the user's face, and/or other parts of the user's body. The air blown on the user's face can be cooled or warmed so as to correspond to the wind in the virtual space. As the user continues walking in the virtual space he encounters a tree. As he reaches out to touch the tree with his right hand (e.g., the glove 502 is on his right hand) the haptic response processing module will return haptic feedback to produce sensations to the user's hand of touching the tree, or the coldness of the tree, or the texture of the tree bark, or the shape of the tree, or even the tree trembling in the breeze.

Figure 6:
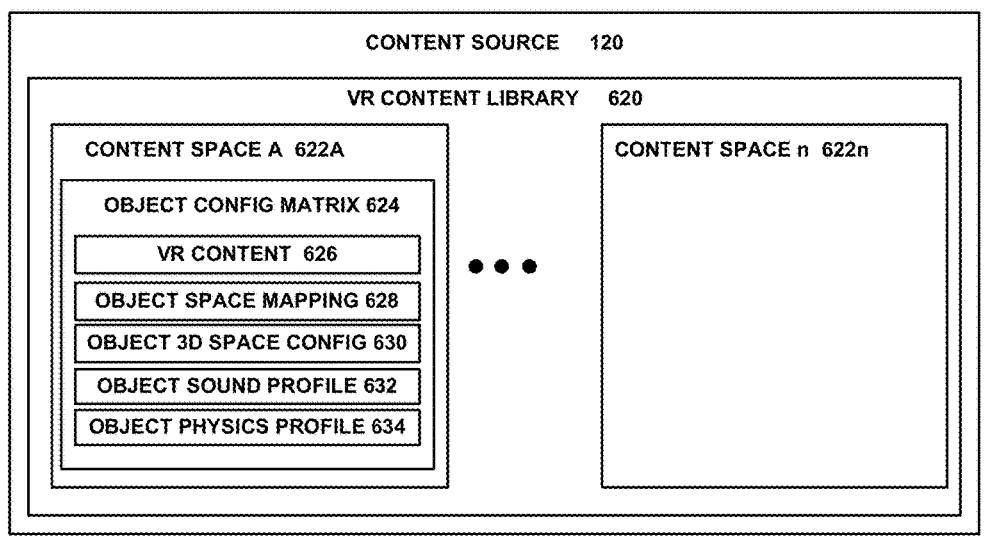
FIG. 6 is a simplified schematic of the content source, in accordance with one of the disclosed embodiments.

FIG. 6 is a simplified schematic of the content source 120, in accordance with one of the disclosed embodiments. The content source 120 can include several modules including a VR content library 620. Multiple content spaces 622A-n are included within the VR content library 620. Each of the content spaces 622A-n include a corresponding object configuration matrix 624 for configuring the various objects in the space described by the content space. VR content 626 provides the data needed by the VR content selection module 510 to identify the virtual space to be displayed on the HMD 102. The object space mapping module 628 defines the location of the various virtual objects displayed in the virtual space.

In one embodiment, the object configuration matrix rendering module 514 will also obtain, access and/or process data (e.g., haptic profile data) associated with one or more virtual objects present or identified in a virtual space. In some embodiments, the virtual objects will be associated with configuration data that defines the attributes, physics, dimension, and possible haptic responses to when the object is interfaced with (e.g., the virtual object is held, moved, crushed, tossed, felt, rubbed, squeezed, pressed, lifted, smashed, bumped, etc.). Depending on the type of interface, the haptic response provided by the haptic response processing module 518 will vary. In some configurations, the type of haptic response may be a combination of haptic responses, e.g., physical, audio, air, pressure, physics, stress, repulsion, temperature, humidity, contraction, or combination of two or more thereof.

The object 3D space configuration module 630 provides the 3D features of the displayed virtual objects. These 3D features can include one or more of weight, shapes, textures and colors of the displayed object and other parameters described above.

The object sound profile 632 provides sounds corresponding to the displayed virtual objects and the virtual space. For example, the sound of wind rustling the leaves of the trees, distant thunder, and animal sounds present in the virtual space displayed on the HMD. The object physics profile 634 may provide the physical motion and/or texture characteristics of the various objects displayed in the virtual space. In some embodiments, one or more of the motion, texture, sound, orientation, and location of the virtual objects are rendered within the virtual space and can be used by the VR content selection module 510 and the VR space generation module 516 to generate the objects in the virtual space when they are to be displayed on the HMD 102. Accordingly, one embodiment will provide that each content space 622 will be associated with one or more of object space mapping 628, object 3D space configuration 630, object sound profile 632 and/or object physics profile 634. In some configurations, the content space can be associated to separate data or files that define one or more attributes of the virtual object. These attributes are used to determine the type and/or magnitude of haptic feedback to provide to the user when interactivity is detected with the virtual object in the virtual scene. In some embodiments, new virtual objects can be brought into the virtual scene in a dynamic form, e.g., another user visits a shared space and he or his avatar brings or introduces a new virtual object (e.g., multi-player). The virtual object, when introduced, will be introduced with its associated attributes. In this manner, no matter who, e.g., the user or the avatar of the user, or another user, interacts with the virtual object is the VR scene, the haptic feedback can be rendered.

Figure 7:
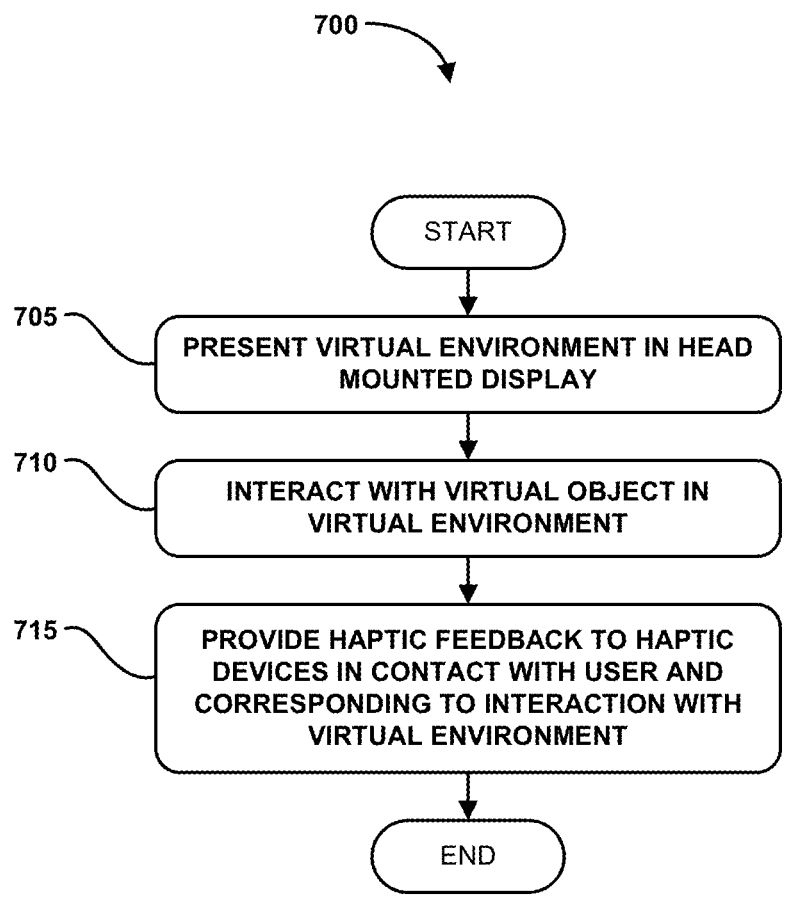
FIG. 7 is a flowchart diagram that illustrates the method operations performed in simulating a varying texture or pressure on the user's hand, in accordance with one of the disclosed embodiments.

FIG. 7 is a flowchart diagram that illustrates the method operations 700 performed in simulating a varying texture, vibration or pressure on the user's hand, in accordance with one of the disclosed embodiments. In an operation 705, the virtual space is presented to the user through the HMD 102. The various virtual objects present in the virtual space are also displayed to the user. In an operation 710, the user interacts with a virtual object in the virtual space such as touching the virtual object with his finger or his hand. As an example, the user can touch a rough surface of a virtual boulder and feel the texture and the temperature of the virtual boulder. In another example, the user could grasp a virtual grip of a virtual sword and feel the shape, pressure and texture of the grip.

In an operation 715, the game console 106 provides the VR input and feedback to the various haptic devices such as gloves which are in contact with the user. As mentioned above, the haptic feedback can be to other peripheral devices 504, the HMD 102, or clothing, or combinations thereof. This provides the user with direct feedback and feeling of the virtual object the user is interacting with in the virtual space.

Figure 8:
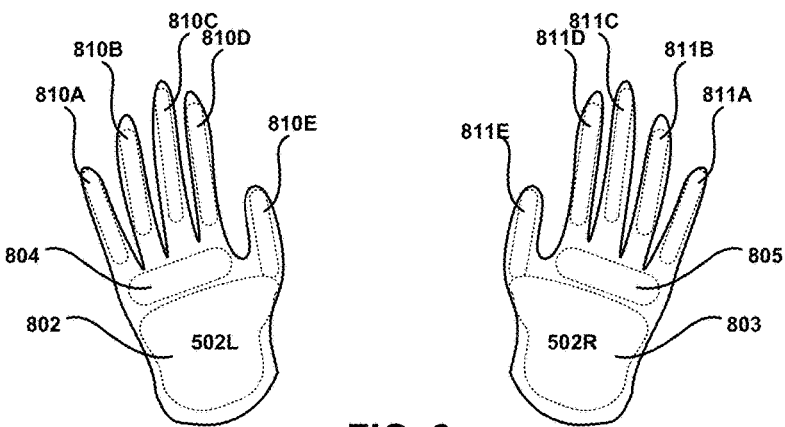
FIGS. 8 and 9 are more detailed schematic diagrams of a left-hand glove and a right-hand glove, in accordance with one of the disclosed embodiments.
Figure 9:
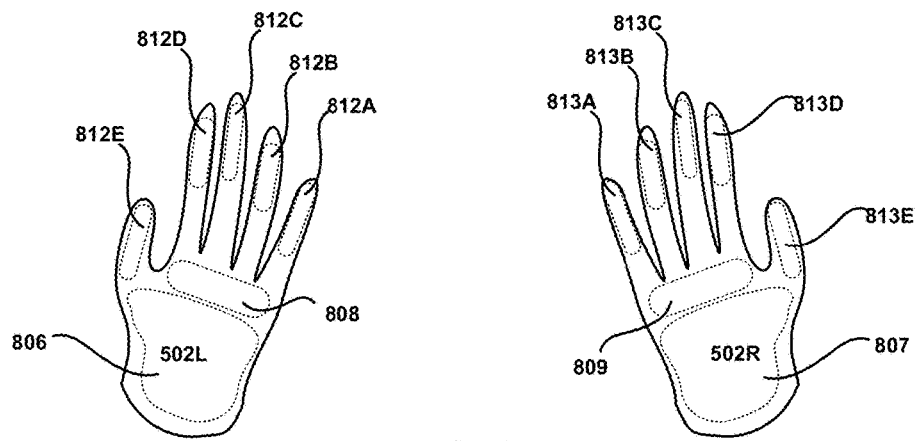

FIGS. 8 and 9 are more detailed schematic diagrams of a left-hand glove 502L and a right-hand glove 502R, in accordance with one of the disclosed embodiments. FIG. 8 illustrates the back side of the gloves 502L, 502R. FIG. 9 illustrates the palm side of the gloves 502L, 502R. Fingers and thumb of the gloves include haptic devices 810A-813E. Haptic devices 810A-813E may provide texture, shape, temperature, vibration and pressure sensations to the user's fingers and thumb. The palm area of the glove also includes haptic devices 804-805 for providing texture, shape, temperature, vibration and pressure sensations to the user's palms. The backside of the gloves may also include haptic devices 806-809 for providing texture, shape, temperature, vibration and pressure to the backside of the user's hands.

Haptic devices 810A-813E, 806-809 can provide one or more of texture, shape, temperature, vibration, pressure and can form the user's hand in different shapes. In one implementation the haptic devices can be inflatable with a fluid such as air or liquid such as water or oil. In another implementation each of the haptic devices can include one or more electromechanical devices such as an offset weight that vibrates, and/or an electromagnetic armature that extends or retracts and/or a piezo-electric device that can vibrate and/or a heating or cooling element and/or an electroactive polymer and/or a phase change material. Haptic devices can also include extending and contracting elements that can cause the user's fingers to extend or curl, respectively.

Figure 10:
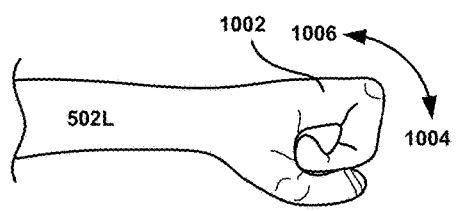
FIG. 10 is a schematic of a glove forming the user's hand in a fist, in accordance with one of the disclosed embodiments.

FIG. 10 is a schematic of a glove 502L forming the user's hand in a fist, in accordance with one of the disclosed embodiments. The glove 502L can include haptic device 1002 capable of causing the user's fingers to curl or extend in directions 1004, 1006, respectively.

Figure 11:
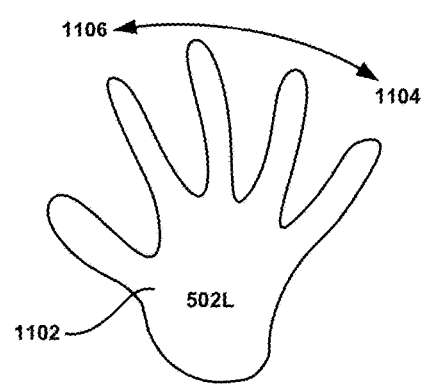
FIG. 11 is a schematic of a glove causing the user's hand to spread out, in accordance with one of the disclosed embodiments.

FIG. 11 is a schematic of a glove 502L causing the user's hand to spread out, in accordance with one of the disclosed embodiments. The glove 502L can include one or more haptic devices 1102 that caused the users fingers and thumb to spread apart in directions 1104, 1106. A combination of the haptic devices 810A-813E, 806-809 and haptic devices 1002, 1102, can be used to form the user's hand in many different configurations not just the first and spread apart configurations shown above.

Figure 12:
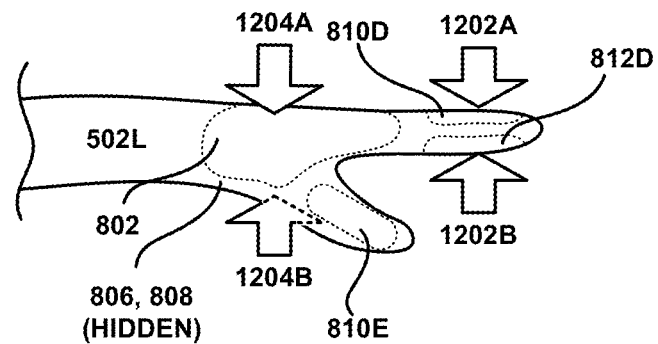
FIG. 12 is a schematic of a glove applying pressure to the user's hand, in accordance with one of the disclosed embodiments.

FIG. 12 is a schematic of a glove 502L applying pressure to the user's hand, in accordance with one of the disclosed embodiments. Haptic devices 810D and 812D can apply pressures 1202A, 1202B, respectively. The pressures 1202A, 1202B squeeze both sides of the user's index finger, in this instance, the left index finger, however it should be understood that corresponding haptic devices can apply pressure to each of the user's fingers and thumb. In a similar manner, haptic devices 802, 806, 808, apply pressures 1204A, 1204B, to the backside of the user's hand and the palm of the user's hand, respectively. Thus, the haptic devices 802, 806, 808, can provide the sensation of squeezing the user's hand.

The haptic devices 802, 806, 808, 810A-813E can also include heating and cooling elements to provide the sensation of hot and cold to the user. The haptic devices 802, 806, 808, 810A-813E can also include air movement elements to provide the sensation of moving air across the user's hand.

It should be understood that the haptic devices can be applied to only the palm side of the user's hand or only the backside of the user's hand or both sides of the user's hand and different portions of the palm and the backside of the user's hand. In one implementation the haptic devices 802, 806, 808, 810A-813E, provide one or more actuators to apply the desired pressure, texture, temperature or movement to the user's hand based on the interactivity with a virtual object in a VR space.

Figure 13:
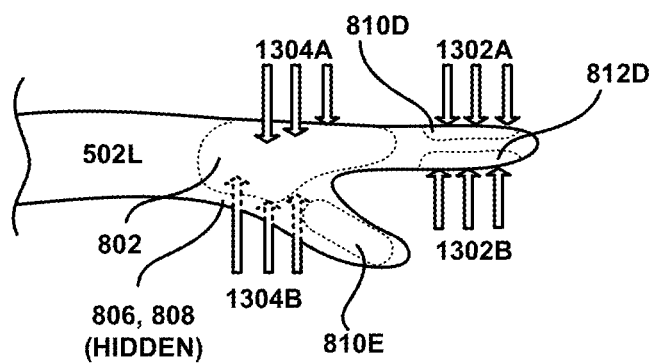
FIG. 13 is a schematic of a glove applying multiple points of pressure to the user's hand, in accordance with one of the disclosed embodiments.

FIG. 13 is a schematic of a glove 502L applying multiple points of pressure to the user's hand, in accordance with one of the disclosed embodiments. Similar to the haptic devices described in FIG. 12 above, the haptic devices 802, 806, 808, 810A-813E, provide multiple actuators to apply the desired pressure, texture or movement to the user's hand. In this manner, the pressure applied or the texture applied can be the same or different over different portions of the user's finger or different portions of the user's thumb or different portions of the back or palm side of the user's hand.

Figure 14:
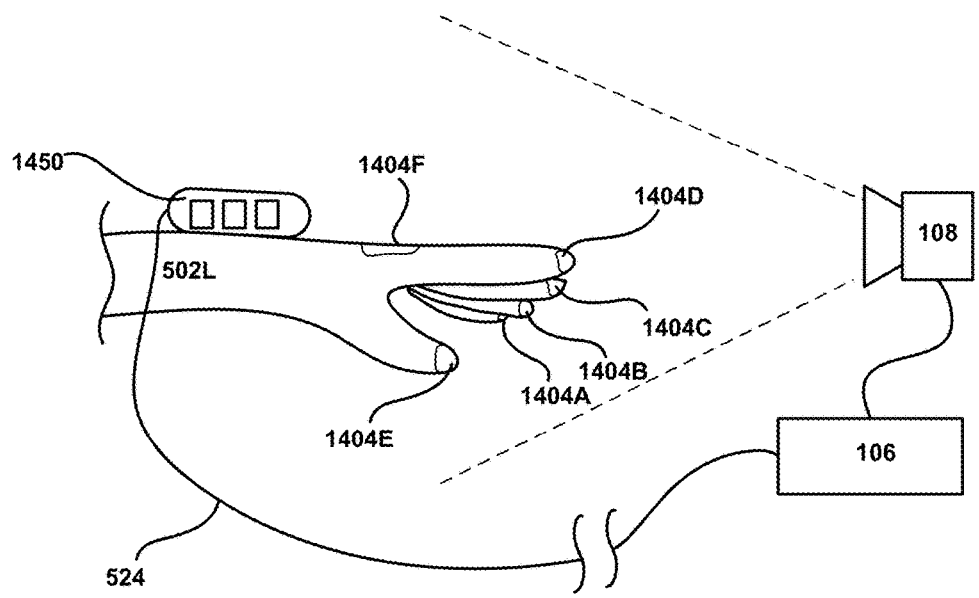
FIG. 14 is a schematic of a glove and a haptic controller, in accordance with one of the disclosed embodiments.

FIG. 14 is a schematic of a glove 502L and a haptic controller 1450, in accordance with one of the disclosed embodiments. The haptic controller 1450 is coupled to the various haptic devices of the glove. The haptic controller 1450 is linked by a network 524 to the game console 106. The network 524 can be wired or wireless or combinations thereof. Haptic controller 1450 can include motion detecting modules, communication modules, controller modules, a haptic profile corresponding to the haptic devices on the glove and the virtual objects in the virtual space presented in the HMD 102. The haptic controller 1450 provides haptic signals to each of the haptic devices to correspond to the haptic feedback data received from the haptic response processing module 518, e.g., during VR space interaction with virtual objects in a VR space.

The camera 108 is also coupled to the game console 106. The camera 108 can monitor motions and locations of the glove 502L within the viewing field of the camera in similar manner as described above with regard to the camera monitoring the motions and locations of the HMD 102. Specifically, the glove 502L, can include one or more tracking marks 1404A-F that the game console 106 can identify in the images captured by the camera.

The tracking marks 1404A-F can include passive markings such as a different color or reflective or other highlighting method of a portion of strategic locations on the glove. For example the fingertips, the thumb tip, the back of the hand and so forth. It should be understood that more than the six tracking marks displayed can be included. In another implementation, the tracking marks 1404A-F can include active markings such as lights or LEDs in addition to or instead of the passive markings. The active markings can be tracked by the game console 106 in the images captured by the camera.

Figure 15:
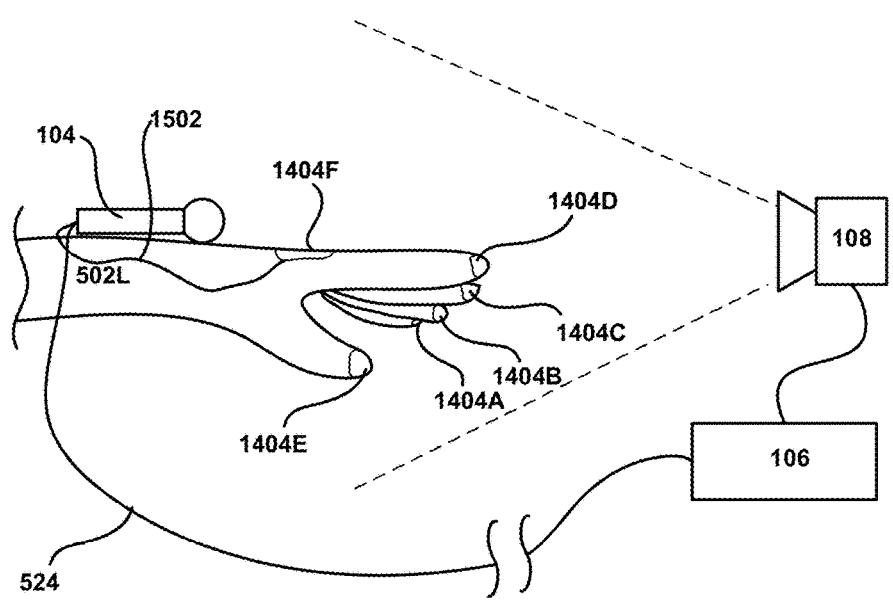
FIG. 15 is a schematic of a glove coupled to a game controller, in accordance with one of the disclosed embodiments.

FIG. 15 is a schematic of a glove 502L coupled to a game controller 104, in accordance with one of the disclosed embodiments. The game controller 104, can provide the wired or wireless data connection to the game console 106. The game controller 104 can also be coupled to the various haptic devices through data connection 1502. The game controller 104 can be configured to provide the haptic signals to each of the haptic devices to correspond with the haptic data received from the haptic response processing module 518 and the game console 106.

Figure 16:
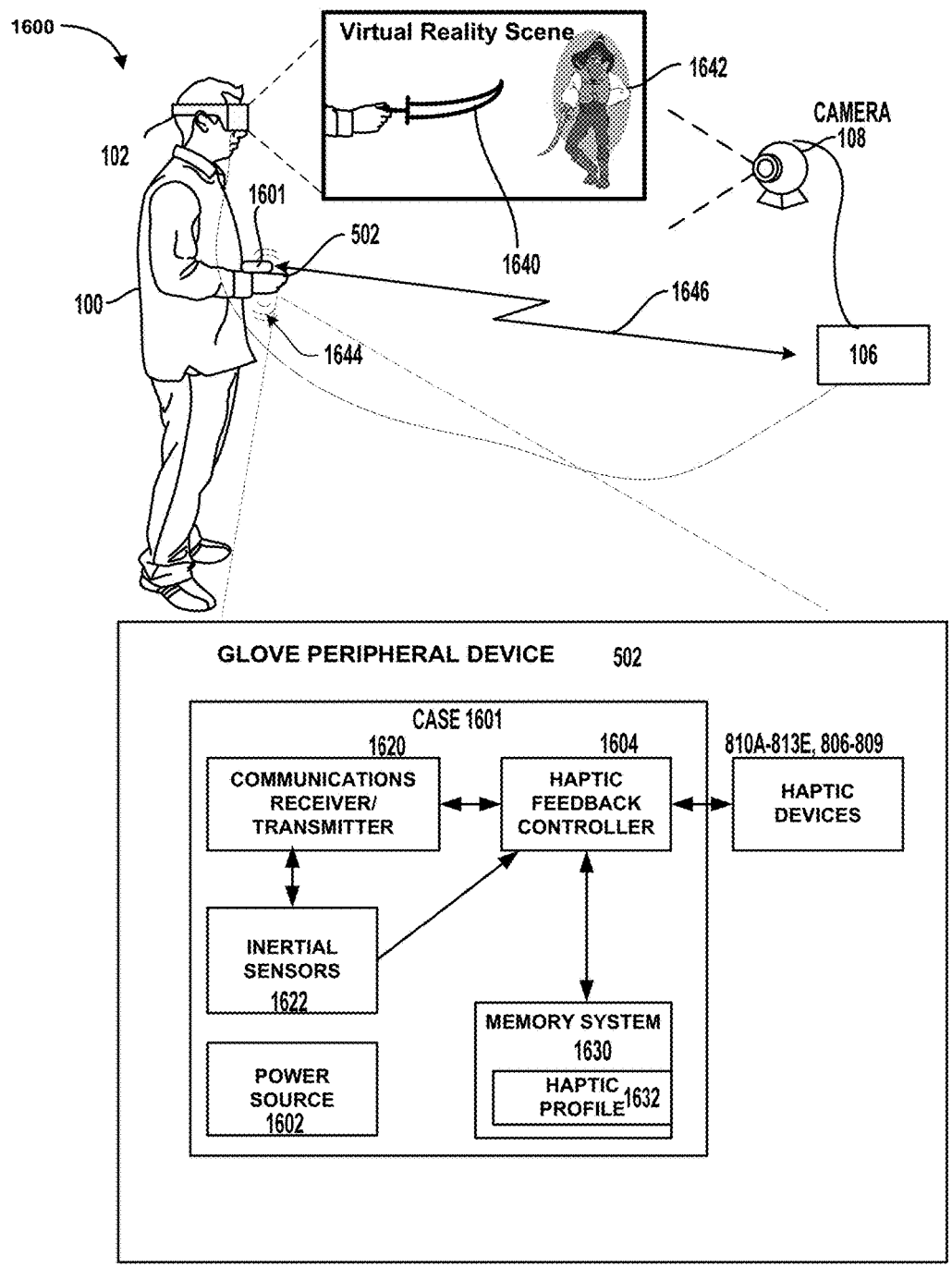
FIG. 16 is a simplified block diagram of a haptic feedback system, in accordance with one of the disclosed embodiments.

FIG. 16 is a simplified block diagram of a haptic feedback system 1600, in accordance with one of the disclosed embodiments. The haptic feedback system 1600 may be included in any suitable peripheral device such as gloves 502L, 502R described above. The haptic feedback system 1600 includes a case 1601, the haptic feedback controller 1604, a memory system coupled to the haptic feedback controller, one or more inertial sensors 1622, a communication link 1620 and a power source 1602. The power source 1602 is coupled to and provides power to each of the feedback controller, the inertial sensors and the communication link.

The inertial sensors 1622 detect motion of the glove and provide the motion information to the communication link 1604 and the haptic feedback controller 1604. The communication link 1604 provides a wired and/or wireless data communication link 1646 between the glove and the game console 106. The communication link 1646 includes an appropriate receiver and transmitter for receiving and sending data.

The haptic feedback controller 1604 is linked to the haptic devices 806-809, 810A-813E in the gloves 502L, 502R and provides haptic signals to the haptic devices corresponding to a haptic profile for the objects displayed in the virtual scene and the motion information received from the inertial sensors. The haptic devices 806-809, 810A-813E provide the corresponding haptic feedback 1644 to the user's hands. In other embodiments, the haptic device need not be gloves, but can be the controller itself, clothing, wrist bands, watches and/or gloves.

By way of example, the haptic devices can provide the user the feeling and/or sensation of texture, shape, weight, resistance, balance, softness, hardness or combination of two or more thereof. In this example, the haptic feedback can provide the feeling of the grip on the user's sword 1640 in the virtual reality scene displayed on the HMD 102. If the pirate 1642, in the scene, were to strike the user's sword in the virtual scene, the haptic devices can provide the corresponding feeling of the clash of the swords to the user's hand such as a vibration transmitted through the user's sword to the user's hand.

Figure 17:
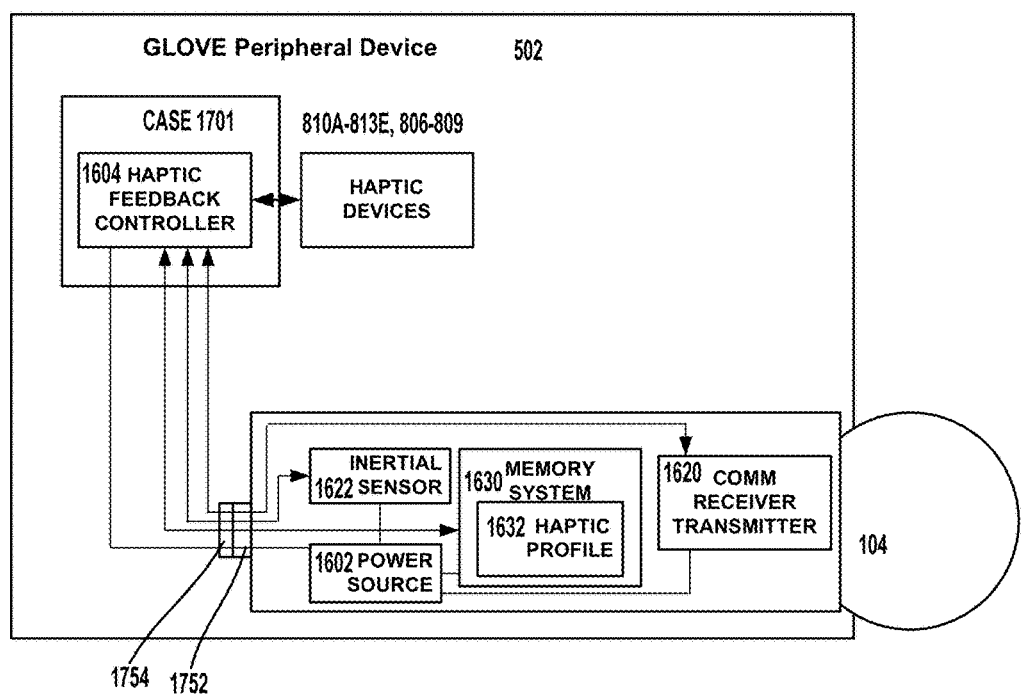
FIG. 17 is a simplified block diagram of a haptic feedback system in a glove that is coupled to a game controller 104, in accordance with one of the disclosed embodiments.

FIG. 17 is a simplified block diagram of a haptic feedback system 1700 in a glove 502 that is coupled to a game controller 104, in accordance with one of the disclosed embodiments. The game controller 104 is coupled to the peripheral device via data ports 1752, 1754 to provide data to the haptic feedback controller 1604. Coupling the glove 802 to the game controller 104 simplifies the glove and thereby reduces costs of the glove. In another embodiment, the glove can wirelessly communicate with the game console 106 and or a controller.

In some embodiments, the game controller 104 may include the haptic feedback controller 1604 and the game controller could be coupled directly to the haptic devices 806-809, 810A-813E.

The haptic profile 1632 includes the haptic characteristics of a virtual object presented to the user in the virtual environment. By way of example, the haptic profile 1632 may include a multi-dimensional graph that characterizes the shape, textures, and other feelings such as motions, vibrations characteristics of the virtual object. The haptic profile can also include one or more of the above disclosed attributes.

The haptic profile 1632 may be initially included in the data, software and hardware forming the virtual environment in the memory system 1630 of the computer 106. When the corresponding virtual object is presented to the user in the virtual environment, the haptic profile 1632 is communicated to the haptic feedback controller 1604. The haptic feedback controller 1604 uses the haptic profile 1632 to generate corresponding haptic signals to the haptic devices to correspond to the actions of the virtual object in the virtual environment. Communicating the haptic profile to the haptic feedback controller 1604 reduces a time delay that may occur if the haptic profile 1632 only resided in the computer 106.

By way of example, communicating the haptic profile 1632 to the haptic feedback controller 1604 may only be required once during a corresponding virtual reality scene presented to the user in the HMD 102, thereby reducing the data required to be communicated from the computer 106 to the haptic feedback controller 1604. The computer 106 may communicate one or more haptic profile adjustments, that may be simpler and less data than communicating a complete haptic profile, during the virtual reality scene presented to the user in the HMD 102.

The haptic feedback controller 1604, the haptic profile 1632 may be embodied in individual modules or combined in a single module. The modules may be implemented in software, firmware, hardware and combinations of hardware, firmware and software.

Figure 18:
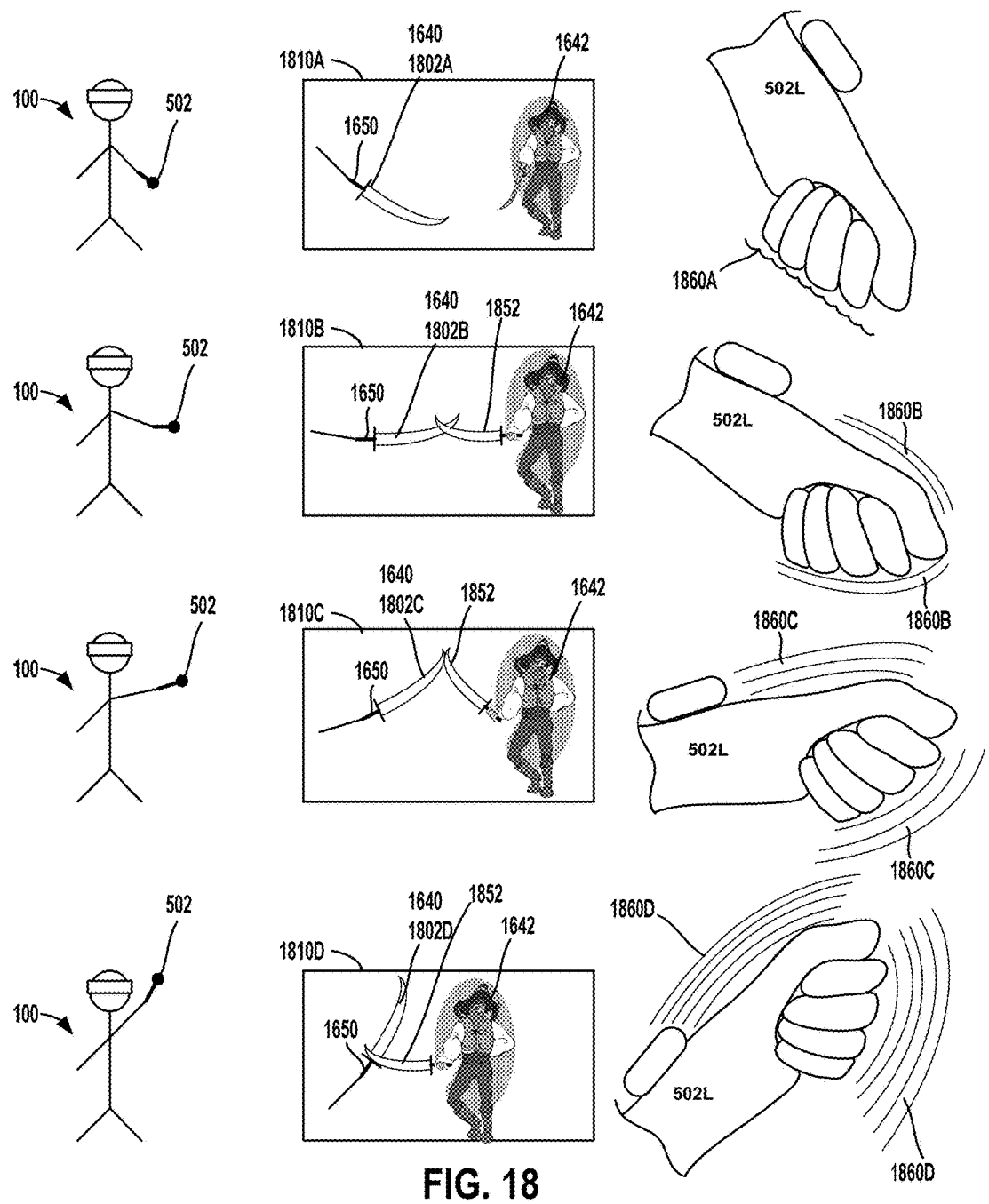
FIG. 18 is an example simplified progression sequence of actions with a virtual sword and the glove providing haptic feedback to the user, in accordance with one of the disclosed embodiments.

FIG. 18 is an example simplified progression sequence of actions with a virtual sword 1604 and the glove 502 providing haptic feedback to the user, in accordance with one of the disclosed embodiments. The user 100 is wearing a HMD 102 and the glove 502. The haptic devices 806-809, 810A-813E in the glove 502 provide the feedback to the user's hand are he uses his sword 1604 in several scenes 1810A-D of the virtual environment shown in the center column. The user 100 is facing a pirate 1642 in a sword fight in the virtual environment.

The pirate approaches in scene 1810A and the user 100 begins to lift the sword 1604 from a lowered position 1802A. The detailed view of the glove 502 is shown in the right column. When the user 100 is initially lifting the sword 1604 from the lowered position 1802A, the haptic devices 806-809, 810A-813E provide texture or physical attributes of the sword handle, e.g., the feedback 1860A shape of the grip 1650 of the sword. The haptic devices 806-809, 810A-813E can also shape the user's hand and as if the user were gripping the leather wrapped grip 1650 of the sword.

In scene 1810B, the user raises the sword 1640 to a more horizontal orientation 1802B and the pirate 1642 lightly touches his sword 1852 to the user's sword 1640. As the pirate's sword 1852 makes contact with the user's sword 1640, the haptic devices 806-809, 810A-813E provide a light vibration feedback 1860B to the user's hand to simulate the vibration that the user would feel if he were holding an actual sword that was lightly touched by another sword.

In scene 1810C, the user raises the sword 1640 higher than horizontal orientation 1802C and the pirate slides his sword 1852 along the user's sword to counter the user's movement. The haptic devices 806-809, 810A-813E provide a vibration feedback 1860C to the user's hand to simulate the vibration that the user would feel if he were holding an actual sword that was the pirate had slid his sword along.

In scene 1810D, the user raises the sword 1640 to a highest orientation 1802D. The highest orientation 1802D to counter a move by the pirate 1642. The pirate sword 1852 strikes the user's sword with a large force as the pirate's sword is stopped by the pommel on the user's sword. The haptic devices 806-809, 810A-813E provide a strong vibration feedback 1860D to the user's hand to simulate the vibration that the user would feel if he were holding an actual sword that was the pirate had hit his sword pommel.

Figure 19:
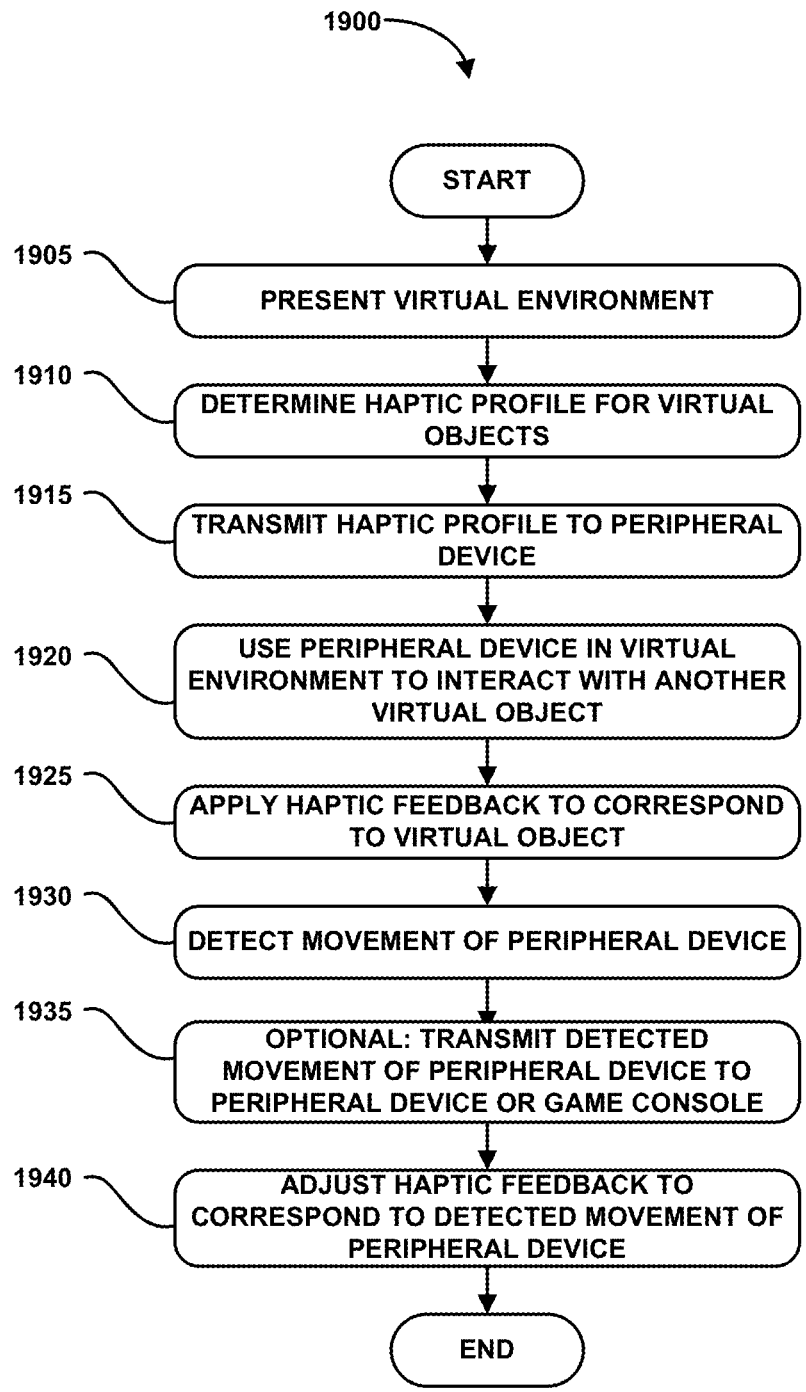
FIG. 19 is a flowchart diagram that illustrates the method operations performed in simulating a varying texture or pressure on the user's hand to correspond with a virtual object, in accordance with one of the disclosed embodiments.

FIG. 19 is a flowchart diagram that illustrates the method operations 1900 performed in simulating a varying texture or pressure on the user's hand to correspond with a virtual object, in accordance with one of the disclosed embodiments. In an operation 1905, a virtual environment is presented to a user. The virtual environment may be presented through a HMD 102. The virtual environment includes virtual objects that the user may interact with e.g., when presented in the HMD 102. By way of example, the user may lift, move, throw, etc. the virtual objects presented in the virtual environment.

In an operation 1910, a haptic profile for each of the virtual objects is determined. The haptic profile may be determined as part of the development of the virtual environment. The haptic profile may also include one or more adjustments to correspond to the current instance of the virtual object, the virtual environment and the user. By way of example, the virtual object may be a sword. The user may select from multiple types of swords e.g., a rapier, a cutlass, a two-handed broad sword, etc. Each of the different types of swords may have a generally similar but not identical haptic profile. Further, additional factors such as the user's virtual armor and the user's physical size may result in adjustments to the haptic profile.

In an operation 1915, the haptic profile is transmitted to a glove 502. The glove includes haptic devices, as described above. The haptic profile may be stored in a memory in the glove for the haptic feedback controller 1604 to use during the simulation of movement and use of the virtual sword 1640.

In an operation 1920, the glove is used in the virtual environment to touch something such as gripping the grip 1650 of the virtual sword 1640, or move a virtual object, or push a virtual object, or compress a virtual object, or crush a virtual object, etc. In an operation 1925, a haptic feedback is provided by the haptic devices in the glove to correspond to a texture of the grip of the virtual sword in the virtual environment. The movement of the user's virtual sword 1640 as described in FIG. 18 above provides an example of the movement of the virtual sword and the corresponding haptic feedback provided by the haptic devices.

In an operation 1930, the motion of the glove is detected by one or more sensors in the glove or physically connected to the glove. The sensors may include one or more of an inertial sensor, an accelerometer, a magnetometer and a gyroscope. The motion of the glove may additionally or alternatively be detected and a tracking signal generated from a tracking system external from the peripheral device, e.g., the camera system 108 described in FIG. 1 et seq. above.

In an operation 1935, if necessary, the detected motion of the handheld peripheral device is transmitted to the haptic feedback controller 1604 in the glove 502. The motion of the glove that is detected by the camera 108, above could be transmitted to the haptic feedback controller 1604. Motion of the glove detected by the sensors 1622 internal to the glove would be received by the haptic feedback controller 1604.

The haptic feedback controller 1604 adjusts the haptic profile and/or the haptic feedback to correspond to the detected motion of the glove and the proximity of or contact with the user's virtual hand to other virtual objects in the virtual environment, in an operation 1940. The adjustment of the haptic and/or the haptic feedback to correspond to the detected motion of the glove may include interactions of the virtual object with another virtual object in the virtual environment. By way of example, the user's virtual sword 1640 may impact the pirate's sword 1852 in a sword fight. The haptic feedback provided by the haptic devices in the glove simulates the physics, e.g., impact of the user's sword 1640 and the pirate's sword 1852.

Continued operation of the movement of the user's virtual sword continues in operations 1925-1940 as described above. The method operations can end when the glove is no longer in contact with a virtual object in the virtual environment.

It should be noted that while a glove capable of providing pressure, vibration and texture to a user's hand, corresponding to 3D virtual objects in the HMD environment, as described above, a glove is merely an example implementation. Similarly, other wearable devices or clothing and footwear could also be used to provide pressure and texture to a user's body and feet, corresponding to 3D objects in the HMD environment. Without limitation, the haptic feedback provided can include temperature, vibration, pressure, shape, sound texture and air flow across the user's skin.

Figure 20:
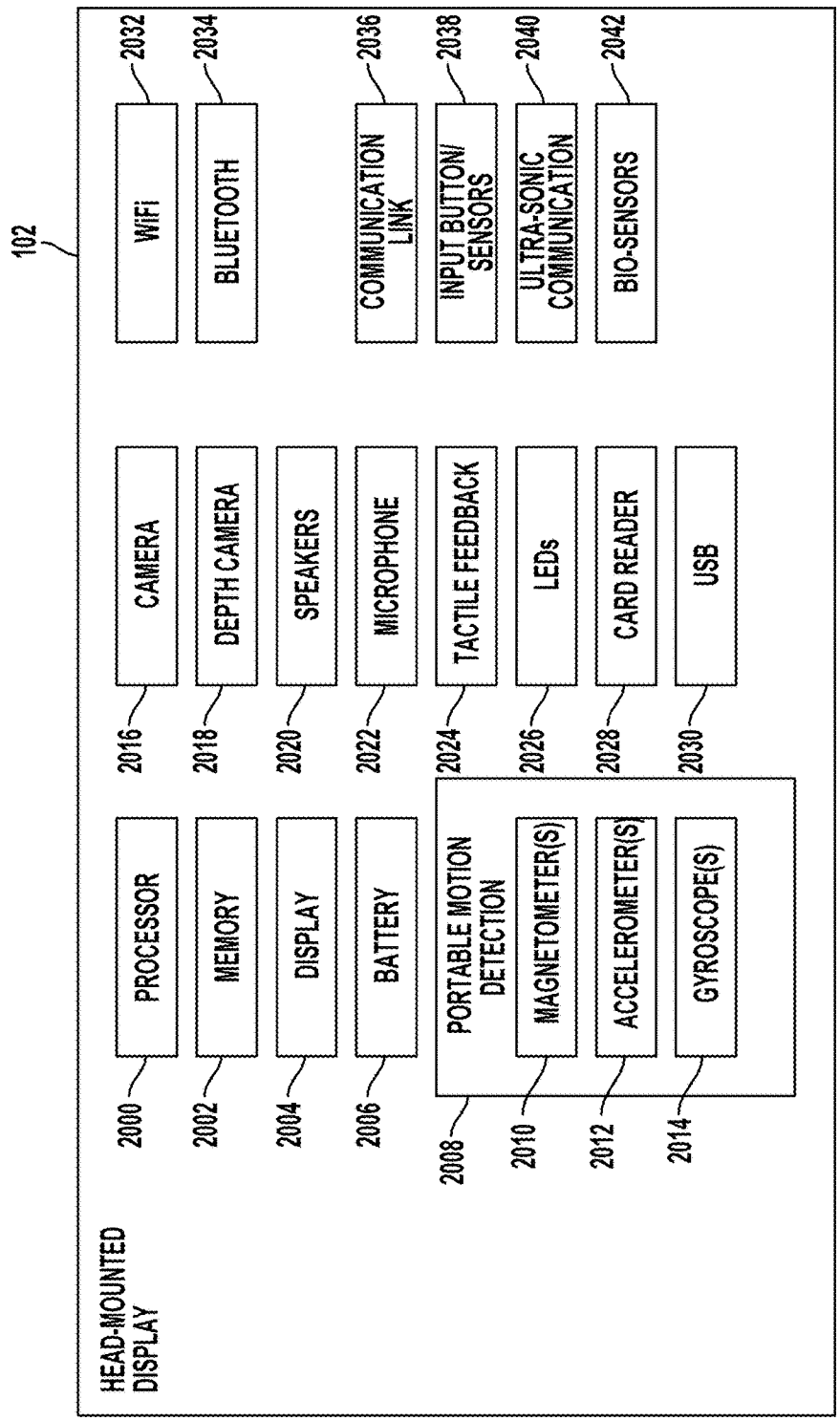
FIG. 20, a diagram is shown illustrating example components of a head-mounted display, in accordance with one of the disclosed embodiments.

With reference to FIG. 20, a diagram is shown illustrating example components of a head-mounted display 102, in accordance with one of the disclosed embodiments. It should be understood that more or less components may be included or excluded from the HMD 102, depending on the configuration and functions enabled. The head-mounted display 102 may include a processor 2000 for executing program instructions. A memory 2002 is provided for storage purposes, and may include both volatile and non-volatile memory. A display 2004 is included which provides a visual interface that a user may view.

The display 2004 may be defined by one single display, or in the form of a separate display screen for each eye. When two display screens are provided, it is possible to provide left-eye and right-eye video content separately. Separate presentation of video content to each eye, for example, may provide for better immersive control of three-dimensional (3D) content. As described above, in one embodiment, the second screen 107 is provided with second screen content of the HMD 102 by using the output for one eye, and then formatting the content for display in a 2D format. The one eye, in one embodiment, may be the left-eye video feed, but in other embodiments it may be the right-eye video feed.

A battery 2006 may be provided as a power source for the head-mounted display 102. In other embodiments, the power source may include an outlet connection to power. In other embodiments, an outlet connection to power and a battery 2006 may be provided. A motion detection module 2008 may include any of various kinds of motion sensitive hardware, such as a magnetometer 2010, an accelerometer 2012, and a gyroscope 2014.

An accelerometer 2012 is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers 2012 are used to provide the direction of gravity, which gives an absolute reference for two angles (world-space pitch and world-space roll).

A magnetometer 2010 measures the strength and direction of the magnetic field in the vicinity of the head-mounted display. In one embodiment, three magnetometers 2010 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp may be calibrated using information from other sensors such as the gyroscope or the camera. In one embodiment, accelerometer 2012 is used together with magnetometer 2010 to obtain the inclination and azimuth of the head-mounted display 102.

A gyroscope 2014 is a device for measuring or maintaining orientation, based on the principles of angular momentum. In one embodiment, three gyroscopes 2014 provide information about movement across the respective axis (x, y and z) based on inertial sensing. The gyroscopes help in detecting fast rotations. However, the gyroscopes may drift overtime without the existence of an absolute reference. This requires resetting the gyroscopes periodically, which may be done using other available information, such as positional/orientation determination based on visual tracking of an object, accelerometer, magnetometer, etc.

A camera 2016 is provided for capturing images and image streams of a real environment. More than one camera (optionally) may be included in the HMD 102, including a camera that is rear-facing (directed away from a user when the user is viewing the display of the HMD 102), and a camera that is front-facing (directed towards the user when the user is viewing the display of the HMD 102). Additionally, a depth camera 2018 may be included in the HMD 102 for sensing depth information of objects in a real environment.

The HMD 102 includes speakers 2020 for providing audio output. Also, a microphone 2022 may be included for capturing audio from the real environment, including sounds from the ambient environment, speech made by the user, etc. The HMD 102 includes tactile feedback module 2024 for providing tactile feedback to the user. In one embodiment, the tactile feedback module 2024 is capable of causing movement and/or vibration of the HMD 102 so as to provide tactile feedback to the user.

LEDs 2026 are provided as visual indicators of statuses of the head-mounted display 102. For example, an LED may indicate battery level, power on, etc. A card reader 2028 is provided to enable the head-mounted display 102 to read and write information to and from a memory card. A USB interface 2030 is included as one example of an interface for enabling connection of handheld peripheral devices, or connection to other devices, such as other portable devices, computers, etc. In various embodiments of the HMD 102, any of various kinds of interfaces may be included to enable greater connectivity of the HMD 102.

A WiFi module 2032 may be included for enabling connection to the Internet via wireless networking technologies. Also, the HMD 102 may include a Bluetooth module 2034 for enabling wireless connection to other devices. A communications link 2036 may also be included for connection to other devices. In one embodiment, the communications link 2036 utilizes infrared transmission for wireless communication. In other embodiments, the communications link 2036 may utilize any of various wireless or wired transmission protocols for communication with other devices.

Input buttons/sensors 2038 are included to provide an input interface for the user. Any of various kinds of input interfaces may be included, such as buttons, gestures, touchpad, joystick, trackball, etc. An ultra-sonic communication module 2040 may be included in HMD 102 for facilitating communication with other devices via ultra-sonic technologies.

Bio-sensors 2042 are included to enable detection of physiological data from a user. In one embodiment, the bio-sensors 2042 include one or more dry electrodes for detecting bio-electric signals of the user through the user's skin, voice detection, eye retina detection to identify users/profiles, etc.

The foregoing components of HMD 102 have been described as merely exemplary components that may be included in HMD 102. In various embodiments of the invention, the HMD 102 may or may not include some of the various aforementioned components. Embodiments of the HMD 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

In one embodiment, clients and/or client devices, as referred to herein, may include head mounted displays (HMDs), terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous users (e.g., P1, P2, . . . Pn). Each of these users may receive or share a video stream, or a single video stream may include regions of a frame generated specifically for each player, e.g., generated based on each user's point of view. Any number of clients may be local (e.g., co-located) or are geographically dispersed. The number of clients included in a game system may vary widely from one or two to thousands, tens of thousands, or more. As used herein, the term "game player" or "user" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD may cooperate with the video server system to deliver a game viewed through the HMD. In one embodiment, the game console receives the video stream from the video server system and the game console forwards the video stream, or updates to the video stream, to the HMD and/or television for rendering.

Still further, the HMD may be used for viewing and/or interacting with any type of content produced or used, such video game content, movie content, video clip content, web content, advertisement content, contest content, gamboling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content may be rendered so long as it may be viewed in the HMD or rendered to a screen or screen of the HMD.

Clients may, but are not required to, further include systems configured for modifying received video. For example, a client may be configured to perform further rendering, to overlay one video image on another video image, to crop a video image, and/or the like. For example, clients may be configured to receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source may include rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic may produce raw video that is encoded. For example, the raw video may be encoded according to an Adobe Flash® standard, HTML-5, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600, 1280×720 (e.g., 720p), 1024×768, 1080p, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, the client may be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 21:
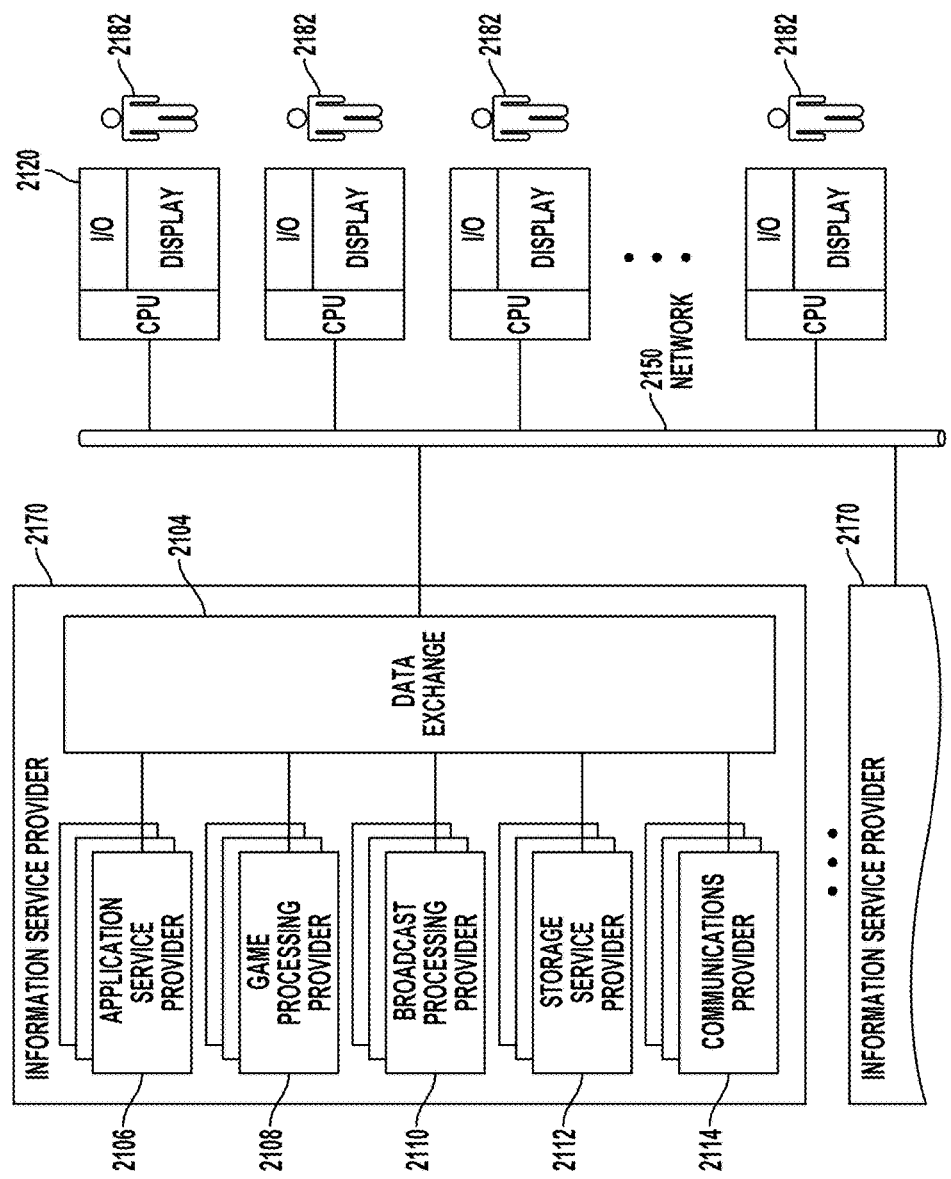
FIG. 21 illustrates an embodiment of an Information Service Provider architecture.

FIG. 21 illustrates an embodiment of an Information Service Provider architecture. Information Service Providers (ISP) 2170 delivers a multitude of information services to users 2182 geographically dispersed and connected via network 2150. An ISP may deliver just one type of service, such as stock price updates, or a variety of services such as broadcast media, news, sports, gaming, etc. Additionally, the services offered by each ISP are dynamic, that is, services may be added or taken away at any point in time. Thus, the ISP providing a particular type of service to a particular individual may change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 2170 includes Application Service Provider (ASP) 2106, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing may be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 2170 includes a Game Processing Server (GPS) 2108 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 2110 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content may reach almost any country in the world.

Storage Service Provider (SSP) 2112 provides computer storage space and related management services. SSPs also offer periodic backup and archiving. By offering storage as a service, users may order more storage as required. Another major advantage is that SSPs include backup services and users will not lose all their data if their computers' hard drives fail. Further, a plurality of SSPs may have total or partial copies of the user data, allowing users to access data in an efficient way independently of where the user is located or the device being used to access the data. For example, a user may access personal files in the home computer, as well as in a mobile phone while the user is on the move.

Communications Provider 2114 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider may also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 2104 interconnects the several modules inside ISP 2170 and connects these modules to users 2182 via network 2150. Data Exchange 2104 may cover a small area where all the modules of ISP 2170 are in close proximity, or may cover a large geographic area when the different modules are geographically dispersed. For example, Data Exchange 2104 may include a fast Gigabit Ethernet (or faster) within a cabinet of a data center, or an intercontinental virtual area network (VLAN).

Users 2182 access the remote services with client device 2120, which includes at least a CPU, a display and I/O. The client device may be a PC, a mobile phone, a netbook, tablet, gaming system, a PDA, etc. In one embodiment, ISP 2170 recognizes the type of device used by the client and adjusts the communication method employed. In other cases, client devices use a standard communications method, such as html, to access ISP 2170.

Embodiments of the present invention may be practiced with various computer system configurations including hand-held devices, microprocessor systems, microprocessor-based or programmable consumer electronics, minicomputers, mainframe computers and the like. The invention may also be practiced in distributed computing environments where tasks are performed by remote processing devices that are linked through a wire-based or wireless network.

With the above embodiments in mind, it should be understood that the invention may employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, or the apparatus may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention may also be embodied as computer readable code on a computer readable medium. The computer readable medium is any data storage device that may store data, which may be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium may include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A system for processing content for a head mounted display (HMD), comprising,
   a user interface device having a haptic device for imparting a haptic feedback to a user, the user interface device configured to receive haptic profiles of virtual objects; and
   a computing device interfaced with the user interface device and the HMD, the computing device including,
   an input device interface for receiving input from the user interface device or the HMD;
   a virtual reality space generation module for rendering a virtual reality scene for the HMD;
   an object configuration matrix rendering module for identifying a virtual object in the virtual reality scene, the object configuration matrix rendering module accessing a haptic profile for the virtual object; and
   a haptic response processing module for identifying interactions between a virtual representation associated with the user interface device and the virtual object and sending the haptic feedback to the user interface device;
   wherein the user interface device is operable to use the haptic profile of the virtual object for imparting the haptic feedback to the user, the haptic feedback drives activation of multiple points of pressure that vary in magnitude across a portion of a finger of the user that contacts the user interface device, the user interface device is configured to maintain the multiple points of pressure with continuous pressure for a duration depending upon said interactions between the virtual representation and the virtual object.

2. The system of claim 1, wherein the user interface is a glove device that includes the haptic device, the glove envelopes said finger of the user that contacts the user interface device, and the haptic response processing module uses the haptic profile to impart changes to the haptic feedback based on a type of interaction detected.

3. The system of claim 2, further comprising,
   a camera for detecting a location of the glove device in real space and a location of the HMD,
   wherein the location of the glove device relative to the HMD in real space identifies a location of the glove device relative to the virtual object in the virtual reality scene;
   wherein the relative location of the glove device and the HMD is used to identify interactions between the glove device and the virtual object and define a magnitude or type of the haptic feedback provided to at least one portion of the glove device.

4. The system of claim 2, further comprising,
   at least one inertial sensor disposed on the glove device, the inertial sensor generating motion data usable by the computer to determine a position of the glove device or changes in position of the glove device.

5. The system of claim 1, wherein the content selected for display in the HMD is accessed from one or both of a local storage of the computing device or over a network.

6. The system of claim 1, wherein each of a plurality of virtual objects have a respective haptic profile, and each haptic profile defines attributes of the virtual object, and attributes of the virtual object can include one or more of a response to being held, a response to being moved, a response to being crushed, a response to being tossed, a response to being dropped, a response to being felt, a response to being rubbed, a response to being squeezed, a response to being pressed, a response to being smashed, a response to being bumped, a definition of size, a definition of temperature, a definition of weight, a definition associated with audio feedback, a definition associated with pressure or texture, a vibration definition, a surface smoothness, a surface roughness, a definition of resistance, of gradual pressure, or combinations of two or more thereof.

7. The system of claim 1, wherein the virtual reality space generation module is configured to continually generate additional content for the HMD depending at least on a location that the HMD is moved toward while rendering the virtual reality scene, the additional content further including one or more additional virtual objects;
   wherein each additional virtual object includes a corresponding haptic profile.

8. The system of claim 1, wherein a pressure gradient defines how to drive activation of the multiple points of pressure across the finger of the user such that the multiple points of pressure follow a nonlinear curve of pressure magnitude.

9. The system of claim 1, wherein the haptic profile defines the haptic feedback following a linear or nonlinear curve based on characteristics of the virtual object which drives activation of the multiple points of pressure.

10. A peripheral device for use in interfacing with a virtual reality scene generated by a computer for presentation on a head mounted display, comprising,
    a haptic device capable of imparting haptic feedback to a user, the haptic feedback includes a pressure gradient applied across a portion of a finger of the user that contacts the peripheral device and
    a haptic feedback controller for processing instructions for outputting a haptic signal to the haptic device, the haptic feedback controller using a haptic profile of a virtual object for outputting the haptic signal, the haptic feedback controller configured to receive the instructions from the computer and to receive the haptic profile of the virtual object from the computer so that the haptic feedback of the haptic device drives activation of multiple points of pressure that vary in magnitude for the pressure gradient that is applied across the portion of the finger of the user in response to an interaction by a virtual representation of the peripheral device with the virtual object in the virtual reality scene when presented on the head mounted display, the haptic feedback controller is configured to maintain the pressure gradient with continuous pressure for a duration depending upon the interaction by the virtual representation with the virtual object in the virtual reality scene;
    wherein the haptic feedback of the haptic device is modified by the haptic feedback controller in response to an additional interaction with the virtual object using the peripheral device.

11. The peripheral device of claim 10, further comprising a motion sensor coupled to the haptic feedback controller, the motion sensor being capable of detecting a motion of the peripheral device relative to the virtual object and wherein the haptic feedback controller is capable of further modifying the haptic feedback to correspond with the detected motion.

12. The peripheral device of claim 10, wherein the haptic profile includes at least one of a characterization of a shape of the virtual object, or a characterization of a texture of the virtual object, or a characterization of a motion of the virtual object, or a characterization of size of the virtual object, or a characterization of physics of the virtual object, or a characterization of sound of the virtual object, or a characterization of a vibration of the virtual object, or a characterization of an amount of pressure virtually exerted on the user by the virtual object, or a characterization of a proximity of the virtual object to a second virtual object, or combinations of two or more thereof.

13. The peripheral device of claim 10, wherein the haptic device includes at least one of:
a compressed gas;
a liquid;
an electric motor;
a linear motor;
an electromagnet;
a piezo-electric device;
a heating element;
a cooling element;
one or more electroactive polymers; or
one or more phase changing materials.

14. The peripheral device of claim 10, wherein the haptic device includes a fluid.

15. The peripheral device of claim 10, further comprising at least one motion sensor coupled to the haptic feedback controller.

16. The peripheral device of claim 10, wherein the haptic device is disposed in a glove capable of being worn by a user, the glove envelopes the finger of the user that contacts the peripheral device.

17. The peripheral device of claim 10, wherein the haptic device is disposed in an article of clothing capable of being worn by the user, the article of clothing envelopes the finger of the user that contacts the peripheral device.

18. A method of simulating a feeling of contact with a virtual object in a virtual scene presented in a head mounted display (HMD), comprising:
tracking a peripheral device when interfacing with the virtual scene, the peripheral device configured to receive haptic profiles of virtual objects;
identifying the virtual object in the virtual scene;
accessing a haptic profile for the virtual object;
sending the haptic profile for the virtual object to the peripheral device; and
detecting a type of interaction between a virtual representation of the peripheral device and the virtual object, and in response to the detected interaction, applying a haptic feedback to the peripheral device as defined by a pressure gradient, the haptic feedback simulates a feeling of contact with the virtual object;
wherein the peripheral device is operable to use the haptic profile to drive application of multiple points of pressure that vary in magnitude across a portion of a finger of the user for the pressure gradient, the peripheral device is configured to maintain the pressure gradient with continuous pressure for a duration depending upon the type of interaction between the virtual representation and the virtual object.

19. The method of claim 18, wherein tracking the peripheral device enables tracking of position of the peripheral device relative to the virtual object in the virtual scene, the tracked position is used to determine the type of interaction and a corresponding type of the haptic feedback based on the haptic profile.

20. The method of claim 18, wherein the peripheral device is a glove device that envelopes said finger of the user and the glove device includes one or more haptic devices, the haptic devices configured to impart the haptic feedback to a hand of a user including said finger, the method further comprising,
detecting movements in the HMD;
changing the virtual scene in response to the detected movements in the HMD, the changes in the virtual scene including rendering a second virtual object, the second virtual object being associated with a second haptic profile.

21. The method of claim 20, wherein the virtual object and the second virtual object are part of a plurality of virtual objects,
wherein each of a plurality of virtual objects have a respective haptic profile, and each haptic profile defines attributes of the virtual object, and attributes of the virtual object can include one or more of a response to being held, a response to being moved, a response to being crushed, a response to being tossed, a response to being dropped, a response to being felt, a response to being rubbed, a response to being squeezed, a response to being pressed, a response to being smashed, a response to being bumped, a definition of size, a definition of weight, a definition associated with audio feedback, a definition associated with pressure or texture, a definition of temperature, a vibration definition, a surface smoothness, a surface roughness, a definition of resistance, of gradual pressure, or combinations of two or more thereof.

22. The method of claim 18, wherein the peripheral device is a glove device and the glove device includes one or more haptic devices, the haptic devices configured to impart the haptic feedback to a hand of a user including said finger.

23. The method of claim 22, wherein at least one of the haptic devices is defined by:
a compressed gas;
a liquid;
an electric motor;
a linear motor;
an electromagnet;
a piezo-electric device;
a heating element;
a cooling element;
one or more electroactive polymers; or
one or more phase changing materials.

* * * * *